United States Patent [19]
Lubbers et al.

[11] Patent Number: 5,390,327
[45] Date of Patent: Feb. 14, 1995

[54] METHOD FOR ON-LINE REORGANIZATION OF THE DATA ON A RAID-4 OR RAID-5 ARRAY IN THE ABSENCE OF ONE DISK AND THE ON-LINE RESTORATION OF A REPLACEMENT DISK

[75] Inventors: Clark E. Lubbers; David W. Thiel, both of Colorado Springs, Colo.

[73] Assignee: Digital Equipment Corporation, Maynard, Mass.

[21] Appl. No.: 85,021

[22] Filed: Jun. 29, 1993

[51] Int. Cl.$^6$ .................. G06F 11/10; G06F 11/20
[52] U.S. Cl. .................. 395/575; 371/10.1; 371/40.1
[58] Field of Search .................. 371/10.1, 40.1; 395/575

[56] References Cited

U.S. PATENT DOCUMENTS

| | | |
|---|---|---|
| 4,092,732 | 5/1978 | Ouchi . |
| 4,434,487 | 2/1984 | Rubinson et al. . |
| 4,775,978 | 10/1988 | Hartness . |
| 4,914,656 | 4/1990 | Dunphy et al. . |
| 4,989,205 | 1/1991 | Dunphy et al. . |
| 4,989,206 | 1/1991 | Dunphy et al. . |
| 5,313,626 | 5/1994 | Jones et al. .......... 395/575 |

OTHER PUBLICATIONS

*A Case for Redundant Array of Inexpensive Disks (RAID)*, David A. Patterson, Garth Gibson, Randy H. Katz, Report No. UCB/CSD 87/391, Dec., 1987, Computer Science Division (EECS), University of California, Berkeley, Calif. 94720.
*A Case for Redundant Arrays of Inexpensive Disks (RAID)*, David A. Patterson, Garth Gibson, and Randy H. Katz, ACM SIGMOD Conference—Jun. 1-3, 1988, Chicago, Ill.
*Two Papers on RAIDs*, Peter Chen, Garth Gibson, Randy H. Katz, David A. Patterson, Martin Schulze, Report No. UCB/CSD 88/479, Dec., 1988, Computer Science Division (EECS), University of California, Berkeley, Calif. 94720.
*An Introduction to RAID—Redundant Arrays of Inexpensive Disks,* Peter McLean, Apr. 24, 1991, Digital Equipment Corporation—CXO1-2/N26.
*Software and Performance Issues in the Implementation of a RAID Prototype,* Edward K. Lee, Report No. UCB/CSD 90/573, May 1990, Computer Science Division (EECS), University of California, Berkeley, Calif. 94720.
*A Queuing Analysis of RAID Architectures,* Schenze Chen and Don Towsley, COINS Tech. Report 91-71, Department of Computer and Information Science, University of Massachusetts, Amherst, Mass. 01003.
*The Digital Guide to RAID Storage Technology,* 1992, Digital Equipment Corporation.

*Primary Examiner*—Charles E. Atkinson
*Attorney, Agent, or Firm*—Albert P. Cefalo; Ronald C. Hudgens; Mary M. Steubing

[57] ABSTRACT

In a storage system having a plurality of disks arranged in a RAID-4 or RAID-5 array, a method of improving the performance and reliability of the array in the absence of a member. The method re-organizes the array into the equivalent of a higher performance and reliability RAID-0 organization while allowing concurrent high performance application access to the array and includes a deliberate reorganization activity concurrent with application access. The method also restores the RAID-4 or RAID-5 organization subsequent to the failure of a member using a replacement member while continuing to allow concurrent high performance application access to the array. In order to perform this reorganization on-line state information is maintained for each parity block, each data block and the array itself. A recently removed disk may be reinserted using an expedited replacement process.

13 Claims, 25 Drawing Sheets

RAID - 5 ORGANIZATION

RAID - 4 ORGANIZATION

FULLY FOLDED RAID - 5 ORGANIZATION

FULLY FOLDED RAID - 4 ORGANIZATION

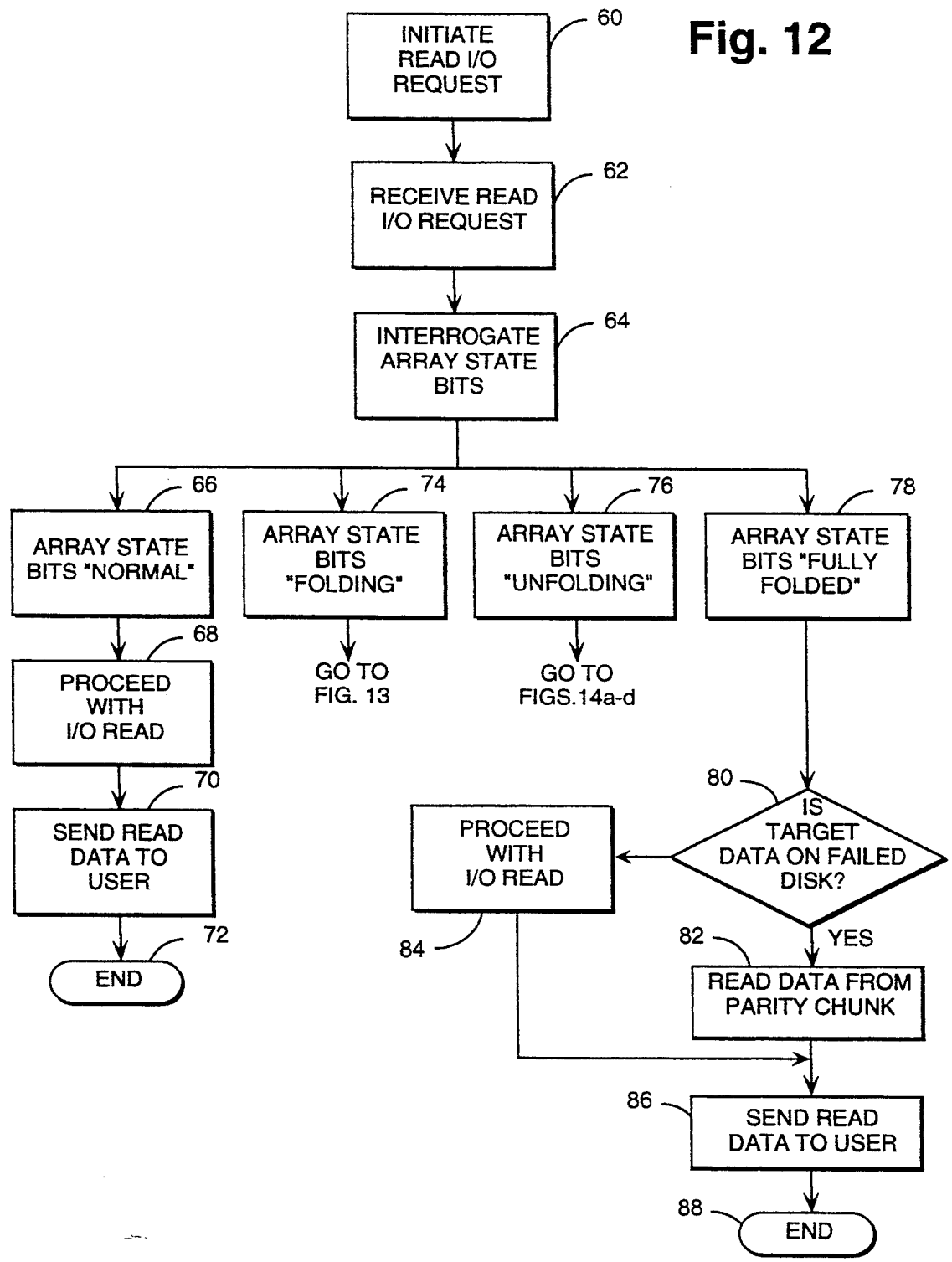

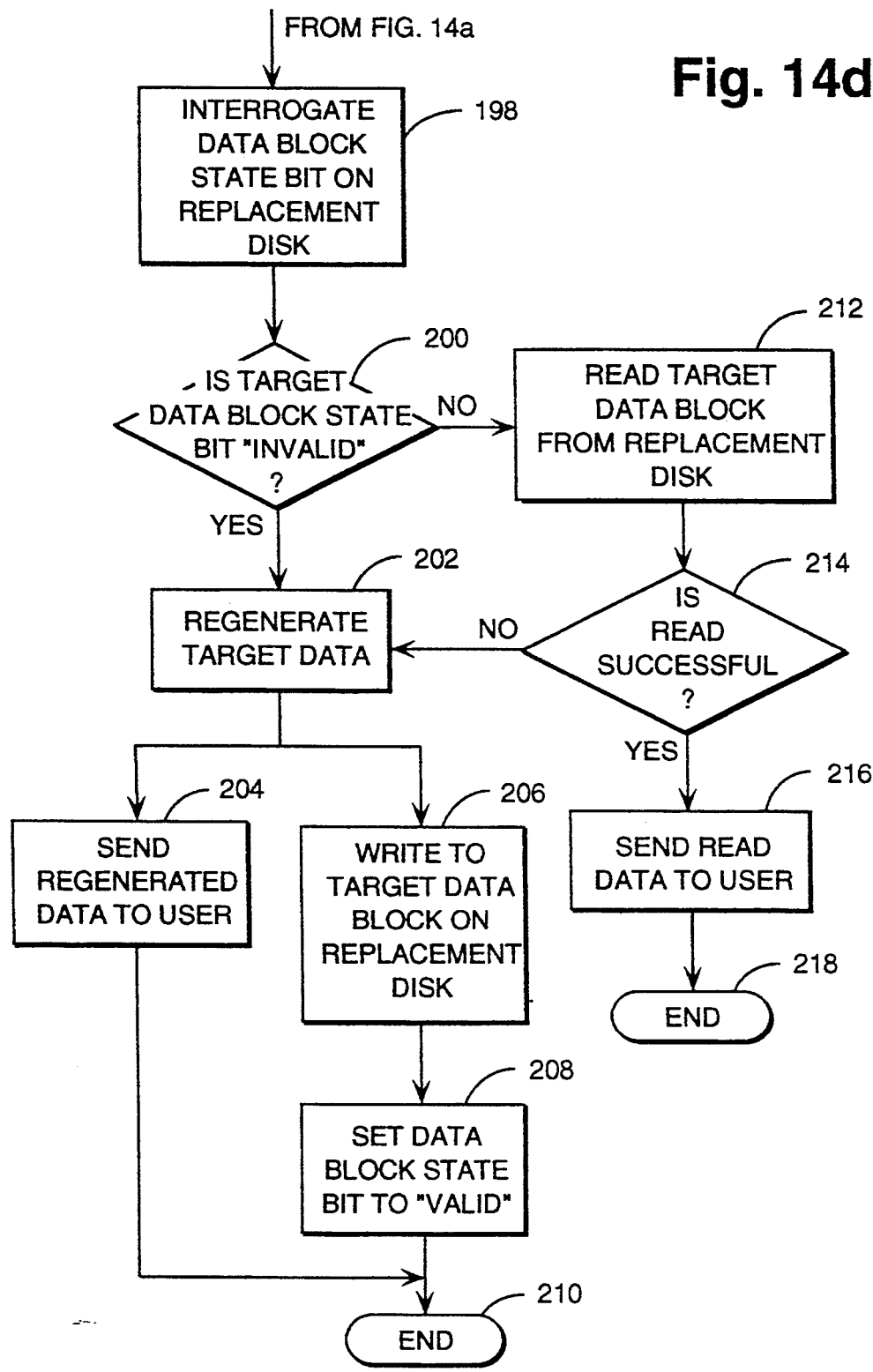

METHOD FOR ON-LINE REORGANIZATION OF THE DATA ON A RAID-4 OR RAID-5 ARRAY IN THE ABSENCE OF ONE DISK AND THE ON-LINE RESTORATION OF A REPLACEMENT DISK

FIELD OF THE INVENTION

Data storage systems having a plurality of disks using RAID-4 or RAID-5 organizations experience a decrease in performance and reliability and an increase in the cost of operation of the array when one of the disks in the array fails and has not yet been replaced. The present invention is a method of on-line reorganization of the data on the RAID array at the time of failure to prevent both a decrease in performance and reliability and an increase in the cost of operation while fully preserving data integrity. The reorganization is driven by on-line user application access to the missing disk. In addition, a deliberate process to complete the reorganization proceeds concurrently with application user access to the array. When a replacement disk is added to the RAID array during or after reorganization is complete, the replacement disk is reconstructed on-line in the same fashion as described above for the original reorganization.

BACKGROUND OF THE INVENTION

RAID (Redundant Array of Independent/Inexpensive Disks) is an organization of data on a plurality of disks to achieve varying levels of availability and performance. One performance enhancing feature of RAID is "striping" which spreads data across the disks in the array. Each disk in the RAID array is referred to as a member of the array. Furthermore, while disks are referred to throughout, any equivalent storage media could be used as would be apparent to one of ordinary skill in the field. The data is broken down into segments referred to as "chunks." A chunk is a group of consecutively numbered blocks that are placed consecutively on a single disk before placing blocks on a different disk. A block is the smallest unit of data that can be read or written to a disk. Thus, a chunk is the unit of data interleaving for a RAID array. For example, in a four disk RAID array the first chunk is placed on the first disk, the second chunk is placed on the second disk, the third chunk is placed on the third disk, the fourth chunk is placed on the fourth disk, the fifth chunk is placed on the first disk and so on. This spreading of data increases performance through load balancing.

RAID enhances availability of data through data redundancy. In a RAID level 4 (RAID-4) and RAID level 5 (RAID-5) data redundancy is achieved by "parity." Parity involves the use of error correction codes (ECC) such as Exclusive-OR or Reed-Solomon. Parity data is stored in the RAID array and is used to reconstruct the data if a disk fails or a data block otherwise becomes unavailable.

As is well known, there are several levels of RAID, each of which has different characteristics that affect performance and availability. One common aspect of all RAID levels is that each array appears as one large virtual disk to the user. RAID storage systems can be implemented in hardware or software. In the hardware implementation the RAID algorithms are built into a controller that connects to the computer I/O bus. In the software implementation the RAID algorithms are incorporated into software that runs on the main processor in conjunction with the operating system. In addition, the software implementation can be affected through software running on a well-known RAID controller. Both the hardware and software implementations of RAID are well known to those of ordinary skill in the field.

RAID level 4 (RAID-4) and RAID level 5 (RAID-5) are organizations of data for an array of $n+1$ disks that provide enhanced performance through the use of striping and enhanced data availability through the use of parity. A parity block is associated with every n data blocks. The data and parity information is distributed over the $n+1$ disks so that if a single disk fails, all of the data can be recovered. RAID-4 is a level of organization of data for a RAID array where data blocks are organized into chunks which are interleaved among the disks and protected by parity and all of the parity is written on a single disk. RAID-5 is a level of organization of data for a RAID array where data blocks are organized in chunks which are interleaved among the disks and protected by parity and the parity information is distributed over all of the disks in the array. In both RAID-4 and RAID-5 the ensemble or array of $n+1$ disks appears to the user as a single, more highly available virtual disk.

The contents of each bit of the parity block is the Exclusive-OR of the corresponding bit in each of the n corresponding data blocks. In the event of the failure of a single disk in the array, the information from a given data or parity block on the failed disk is regenerated by calculating the Exclusive-OR of the contents of the corresponding blocks on the surviving disks. A block or set of blocks is repaired by writing the regenerated data. The regeneration and repair of data for a data block or set of data blocks on a disk in a RAID array is referred to as reconstruction.

When a disk in the RAID array fails, it can be replaced with a new disk and the contents of the failed disk reconstructed using the standard RAID algorithms and the contents of the other disks. In this manner, the RAID array with the replacement disk is restored to its fully redundant state without the loss of application data. Under some circumstances a failed disk in the RAID array cannot be reconstructed or replaced promptly. During the time that the failed disk remains out of the RAID array the cost of operations increases and performance and reliability decrease. Accordingly, if the storage system is to operate for any period of time with a failed disk of the RAID array it is desirable to improve performance and reliability and prevent an increase in the cost of operation. One method of achieving these goals is described herein and in a co-pending application Ser. No. 08/084,370, filed Jun. 29, 1993, titled Method for Reorganizing the Data on a RAID-4 or RAID-5 Array in the Absence of One Disk by Joseph F. Krantz, which is incorporated herein by reference and described hereinafter. In a RAID array with a failed disk the data is reorganized one strip at a time by regenerating the unavailable data using standard RAID algorithms and writing the regenerated data over the parity information. The process of reorganizing the data is referred to as "folding" and the RAID array with the reorganized data is referred to as "fully folded." After the failed disk is replaced the fully folded RAID array is returned to its original or normal RAID organization by an "unfolding" process. The unfolding process realigns the data to its original position in the strip and calculates the parity information and writes the parity information to its original chunk of the strip.

The folding and unfolding processes are easy to implement provided concurrent application access to the array is inhibited. However, preventing application access to the RAID array is undesirable. Accordingly, it is desirable to complete the above folding and unfolding operations while permitting concurrent application access to the array.

SUMMARY OF THE INVENTION

The present invention is a method of improving the performance and reliability of the RAID-4 and RAID-5 array while keeping the cost of operation from significantly increasing when a member disk has failed and has not yet been replaced. The method is performed on-line, concurrently with continuing application access to the array. The method reorganizes the data in the RAID array at the time a disk in the array fails, so that read and write operations to the array require the optimal number of operations and so that the performance of the RAID array and reliability of the data stored on the array is maximized while the cost of operation to the array is minimized. The reorganization is performed on each strip of the array. A strip is the collection of a parity chunk and all of the data chunks that contributed to it. The reorganization is partially driven by application access to the array and partially by a deliberate process to complete the reorganization which proceeds concurrently with application user access to the array. During the transition time while the data is being reorganized, read or write operations to the missing disk could result in corrupt or invalid data and this is prevented through the use of metadata bits being associated with the data blocks, the parity blocks and the state of the array itself. These metadata bits are stored on a small designated portion of each member disk and also in a cache memory for improved access. After a replacement disk is inserted into the array in place of the failed disk, the method of the present invention provides for the on-line reversal of the data reorganization. The restoration of the data on the replacement disk occurs concurrently with application access to the array.

Furthermore, the method of the present invention provides an expedited process for restoring a recently failed member of the RAID-4 or RAID-5 array, in the event that the failed member is recovered within a modest time interval.

When a failed disk is removed from the RAID array, the unavailable data for each strip of the array is regenerated using the data from the other chunks of the strip and the parity chunk of the strip by applying the standard RAID algorithms. The regenerated data corresponds to the unavailable data on the failed disk. The regenerated data is then written over the parity information on the parity chunk of the strip. This process is repeated for each strip forming the RAID array. The resulting organization of data is essentially that of a RAID-0 organized array except that the mapping of the data on the array may be unconventional. RAID-0 is a level of organization of data for a RAID array where the data is striped but is non-redundant. The resulting organization of data is referred to as a "fully-folded" RAID array and the process of reorganizing the data on the array is referred to as "folding."

During the transition, when a replacement disk is added to a fully folded RAID array to restore the array to a redundant state, the folding process is reversed. For each strip in the array, if the replacement disk should contain parity information, an Exclusive-OR operation computes the parity from the data chunks on the other disks and writes the parity to the replacement disk. If the replacement disk should contain data, the data is read from the disk that originally contained parity and written on the replacement disk, then parity is computed from the corresponding data blocks and written on the appropriate disk.

BRIEF DESCRIPTION OF THE DRAWINGS

Other advantages of the invention will become apparent upon reading the following detailed description and upon reference to the accompanying drawings, in which:

FIG. 12 is a flow chart illustrating the process according to the present invention for a read I/O request.

FIGS. 14a–d are flow charts illustrating the read operation when the array state is "unfolding" according to the present invention.

FIGS. 16a–c are flow charts illustrating the write operation when the array state is "unfolding" according to the present invention.

Figure 1:
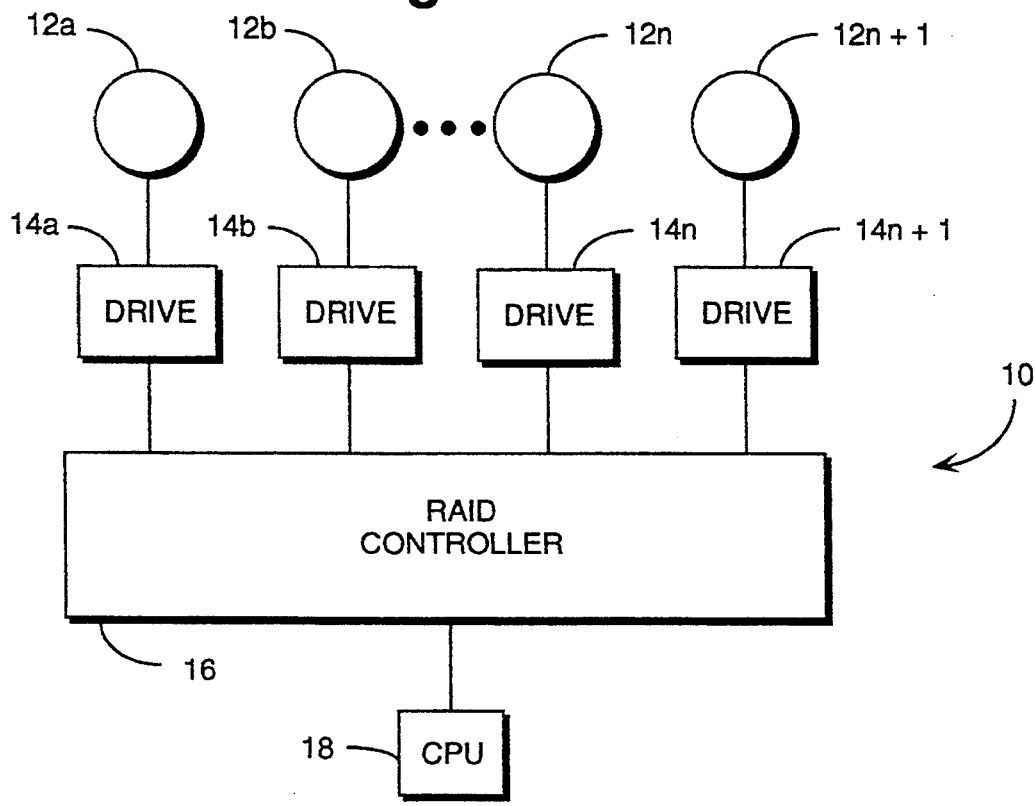
FIG. 1 is a typical storage system using a RAID array organization for implementing the present invention.

While the invention is susceptible to various modifications and alternative forms, specific embodiments thereof have been shown by way of example in the drawings and will herein be described in detail. It should be understood, however, that the invention is not intended to be limited to the particular forms disclosed. On the contrary, the applicant's intention is to cover all modifications, equivalents, and alternatives falling within the spirit and scope of the invention as defined by the appended claims.

DETAILED DESCRIPTION OF THE DRAWINGS

FIG. 1 is an illustration of a storage system 10 in which an array of n+1 disks 12 and associated drives 14 are connected to a RAID controller 16. A user, such as CPU 18, gains access to the n+1 disks 12 via normal read and write commands. The n+1 disks 12 are arranged into either a RAID-4 or RAID-5 organization based upon the selection of the well known RAID algorithms implemented in the RAID controller 16. The present invention is also usable with a host-based software implementation of a RAID controller.

RAID-4 and RAID-5 are closely related organizations of n+1 disks 12 that provide enhanced performance through the use of striping and enhanced availability through the association of a parity block with every n data blocks. The data and parity information is distributed over the array of n+1 disks 12 so that if any single disk fails or otherwise becomes unavailable all of the data and/or parity information on the unavailable disk can be recovered. In the RAID-4 organization, all parity data is on a single disk and in the RAID-5 organization, the parity information is distributed over all of the disks in the array.

All access to the array of n+1 disks 12 is through the RAID controller 16 which is connected to the user or client application such as CPU 18. A single CPU is shown, but using a plurality of CPU's is well within the ability of someone of ordinary skill in the field. The RAID controller 16 contains the standard RAID algorithms that are well known to one of ordinary skill in the art.

The array of n+1 disks 12 appears as a single, more highly available virtual disk to a user. The contents of each bit of the parity block is the Exclusive-OR of the corresponding bit in each of the n corresponding data blocks. As is well known, other error correction codes can be used to establish the mathematical relationship between the data and parity information. In the event of the failure or unavailability of a single disk in the array of n+1 disks 12, the data from a given data block on the unavailable disk is regenerated by computing the Exclusive-OR of the contents of the corresponding parity block and the n−1 data blocks on the remaining disks in the array that contributed to that parity block. The unavailable data block, if possible, is repaired by writing the regenerated data. In this manner an entire unavailable disk can be reconstructed by regenerating data and repairing data blocks and parity blocks. If the regenerated data can not be written on the failed disk, the RAID array must operate with a missing disk which increases the cost of operating the array and decreases performance and availability of data. Of course, a replacement disk can be substituted for the failed disk and the regenerated data is then written on the replacement disk to bring the RAID array back to full redundant operation.

A RAID-4 or RAID-5 array is organized as a collection of strips, each of which contains a set of blocks or chunks from each disk in the array. One of the chunks in a strip contains the parity for the other chunks in the strip. In a RAID-5 organization parity chunks are located on different disks of the array in successive strips. In a RAID-4 organization all parity chunks are located on the same disk in the array.

Figure 2:
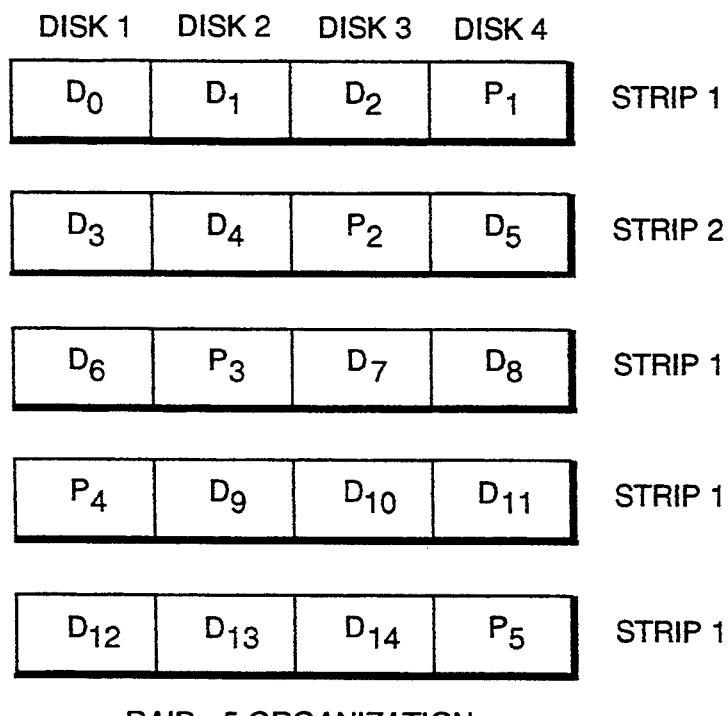
FIG. 2 is an illustration of the strips comprising a four disk storage system organized according to RAID-5.

FIG. 2 illustrates five strips of a four disk RAID array organized according to RAID-5. A plurality of data blocks forming data chunk $D_0$ are located on Disk 1, another plurality of data blocks forming data chunk $D_1$ are located on Disk 2, another plurality of data blocks forming data chunk $D_2$ are located on Disk 3 and another plurality of blocks forming parity chunk $P_1$ are located on Disk 4. The remaining strips are organized in a similar fashion with the parity chunk for the data chunks of each strip being located on a different disk than the preceding or following strip.

Parity chunk $P_1$ is a set of blocks that are the Exclusive-OR parity of the sets of data blocks or chunks $D_0$, $D_1$ and $D_2$. The other parity chunks are similarly identified. Each chunk of data is a consecutively indexed set of blocks on the underlying disk. There are various patterns of data and parity in successive strips that are well known and these differences are irrelevant to the present invention. The data on the virtual disk that is presented by the array is stored on the data blocks in the order $D_0$, $D_1$, $D_2$, $D_3$, $D_4$, etc. Accordingly, ascending data addresses first cover a chunk, then a strip and finally move to the next strip.

Figure 3:
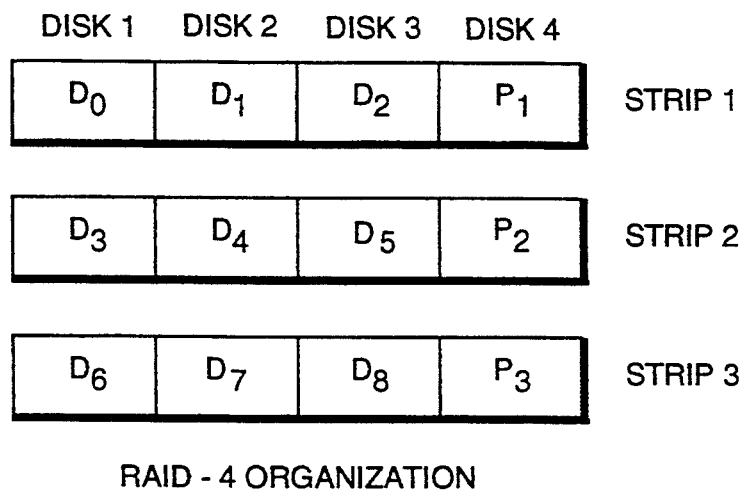
FIG. 3 is an illustration of the strips comprising a four disk storage system organized according to RAID-4.

FIG. 3 is an illustration of three strips of a four disk RAID array organized according to RAID-4. As is well known, the parity chunks $P_1$, $P_2$, and $P_3$ for each strip are located on the same disk in the array. Accordingly, RAID-5 is essentially a generalization of RAID-4 where the location of data and parity chunks within a strip is defined according to some algorithm that is controlled by the index of the strip within the array.

The cost of operations on a RAID-4 or RAID-5 array with a failed disk is different than the cost of operations on the array when a full, redundant set of disks is available. For a RAID-4 or RAID-5 array of n+1 disks, assuming that there are no local errors on any of the non-failed disks, the range of costs of an I/O request targeting data that is contained within a contiguous range of blocks within a single chunk and where n is greater than 1 is, for the two cases of no failed disks and a single failed disk set forth in Table No. 1.

TABLE NO. 1

| Operation | Full Set of Disks | One Disk Failed |
|---|---|---|
| Best case READ | 1 I/O | 1 I/O |
| Worst case READ | 1 I/O | n I/O's |
| Best case WRITE | Min (4, n + 1) I/O's | 1 I/O |
| Worst case WRITE | Min (4, n + 1) I/O's | Max (4, n) I/O's |

For read operations with a full set of disks, a read operation only reads from the disk containing the data. In this situation neither parity nor other data needs to be read. For the case of WRITE operations with a full set of disks, 4 I/O's are required when the read-modify-write (RMW) method is used and (n+1) I/O's are required when the reconstruct-write method is used. The read-modify-write (RMW) method is a write operation comprising the following:
1. Read the data currently in the blocks to be written, referred to as "old" data;
2. Read the parity blocks corresponding to the "old" data, referred to as "old" parity;
3. Exclusive-OR the "old" data with the "old" parity and with the new data to form the "new" parity;
4. Write the new data to the target data blocks; and
5. Write the "new" parity to the corresponding parity blocks.

The reconstruct-write (RW) method is a write operation comprising the following:
1. Identify the set of blocks to which new data is to be written;
2. Read the data from the blocks which are not targets of the write and which contributed to the same parity blocks as the new data;
3. Write the new data to the target data blocks;
4. Write the new parity to the corresponding parity blocks. Both the read-modify-write method and the reconstruct-write method are well known to those of ordinary skill in the field. Of course, an implementation will typically take these differences in I/O's into account in choosing a method to perform the operation.

In the worst case, since all remaining n disks must be read and the unavailable data regenerated, as can be seen in Table 1, the cost of read operations increases overall when a disk is missing. However, the cost of write operations overall changes in a less straight-forward manner. In the best case, the disk is available where the data is to be written and the parity was on the missing disk. In that case the data is just written with no parity update. In the worst case, if the missing disk contains the data location to be written, then, using the reconstruct-write (RW) method, all remaining n−1 blocks must be read and together with the new data Exclusive-ORed to obtain the new parity which is then written over the old parity to disk, for a total of n operations. In the worst case, if the missing disk does not contain the data location to be written or the parity, then using the read-modify-write (RMW) method, both the data block and the parity block must be read and written for a total of four (4) operations.

When an array is without a disk, the impact of the failure of a single block on the surviving disks becomes important. In an array with a missing disk, the failure of a single block of data on a surviving disk causes a loss of either one or two blocks of data. If the single failed block on the surviving disk contains parity then only the data block on the missing disk which contributes to this parity is lost. However, if the single failed block on the surviving disk contains data then both that data block and the data block with which it shares parity on the missing disk are lost. Thus, a block of data stored on a RAID-4 or RAID-5 array with one missing disk is less reliable than one block of data stored on a single, non-array disk or on a RAID-0 array since, in either of these cases, the failure of a single block causes the loss of exactly 1 block of data.

Figure 4:
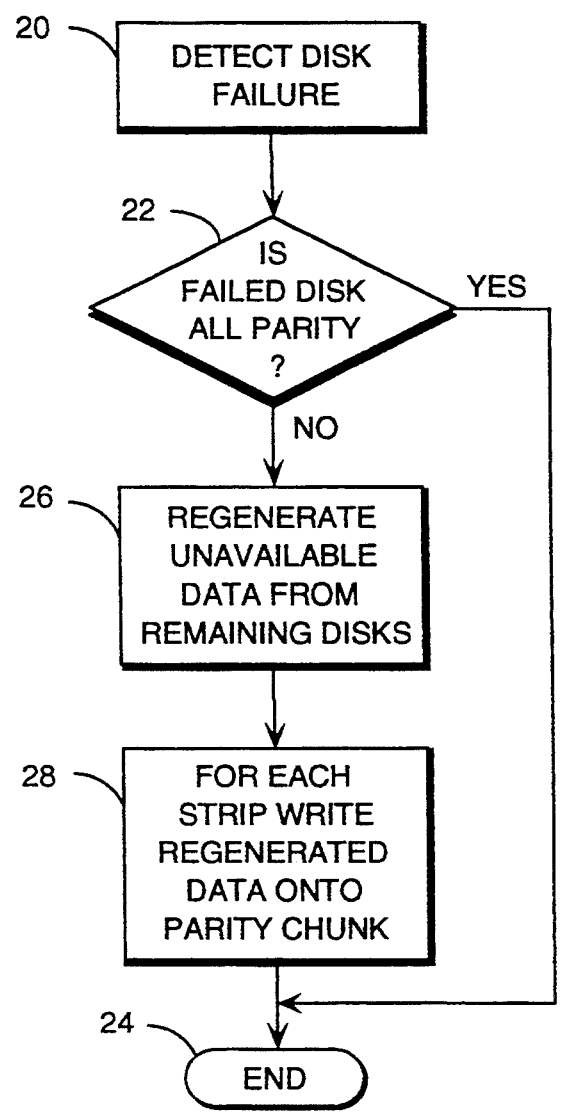
FIG. 4 is a flow chart for the process of folding a RAID array off-line.

FIG. 4 is a flow chart illustrating the process of off-line reorganization of the data when a disk in the RAID array fails. The failure of a disk in the array is detected at step 20. It is determined whether the failed disk was all parity at step 22 which would only be possible in a RAID-4 organization. If the failed disk only contained parity, all of the data remains and no reorganization of the data is necessary and the process ends at step 24. If the failed disk was not all parity, either RAID-4 or RAID-5 organization, then the reorganization of data according to the present invention begins with the regeneration of the missing data from the remaining disks at step 26 using the standard RAID algorithms. The regeneration continues one strip at a time. The regenerated data for each strip is then stored at the chunk for that strip which originally contained parity at step 28. After all strips are reorganized, the process stops at step 24.

Figure 5:
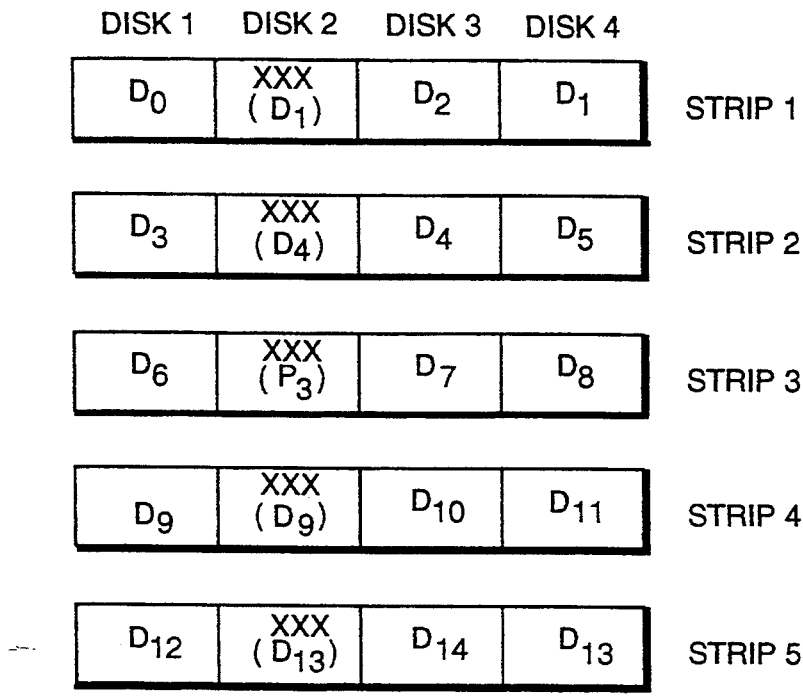
FIG. 5 is an illustration of the strips comprising a four disk system organized according to RAID-5 fully folded according to the present invention.

FIG. 5 is an illustration of a four disk storage system using RAID-5 organization as shown in FIG. 2 that has been reorganized due to the failure of Disk 2. For strip 1, the regeneration process uses the data from chunk $D_0$ and $D_2$ and the parity from chunk $P_1$ to obtain the data unavailable from chunk $D_1$ on Disk 2. The data for chunk $D_1$ is then written on Disk 4 over the original parity information. For strip 2, the regeneration process uses the data from chunk $D_3$ and $D_5$ and the parity from chunk $P_2$ to obtain the data unavailable from chunk $D_4$. The data for chunk $D_4$ is then written on Disk 3 where the original parity chunk $P_2$ was located. For strip 3, no regeneration is necessary since the chunk lost contained only parity. Accordingly, no reorganization of the data is necessary. For strip 4, the regeneration process uses data from chunk $D_{10}$ and $D_{11}$ and the parity from chunk $P_4$ to obtain data unavailable from chunk $D_9$ on Disk 2. The data for chunk $D_9$ is then written on Disk 1 at chunk $P_4$ where the original parity chunk $P_4$ was located. For strip 5, the regeneration used the data from chunk $D_{12}$ and $D_{14}$ and the parity chunk $P_5$ to obtain the data unavailable from chunk $D_{13}$ on Disk 2. The data for chunk $D_{13}$ is then written on Disk 4 at chunk $P_5$ where the original parity chunk $P_5$ was located.

The reorganized strips are illustrated in FIG. 5. After the reorganization, the resulting organization is essentially a RAID-0 array. RAID-0 is a level of organization in which the data is striped over all disks but no redundant or parity information is stored. The resulting array is referred to as a fully folded RAID-5 array and the process of reorganization is referred to as folding.

Figure 6:
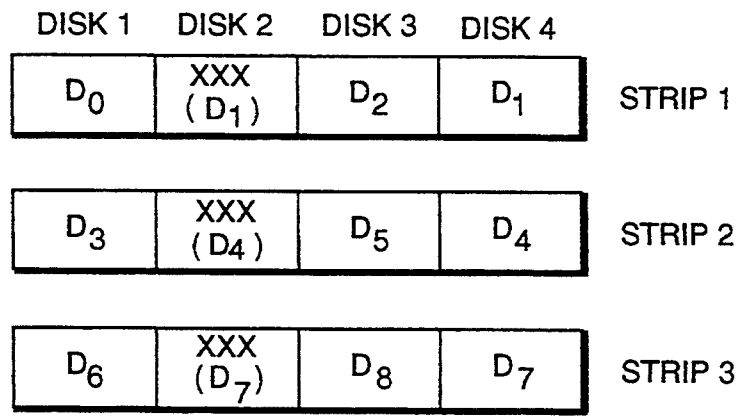
FIG. 6 is an illustration of the strips of a storage system organized according to RAID-4 fully folded according to the present invention.

FIG. 6 illustrates a fully folded RAID-4 array after array Disk 2 failed. The same process as described above is used to regenerate the data for the failed disk and to write the regenerated data onto the strip chunk previously containing parity.

Figure 7:
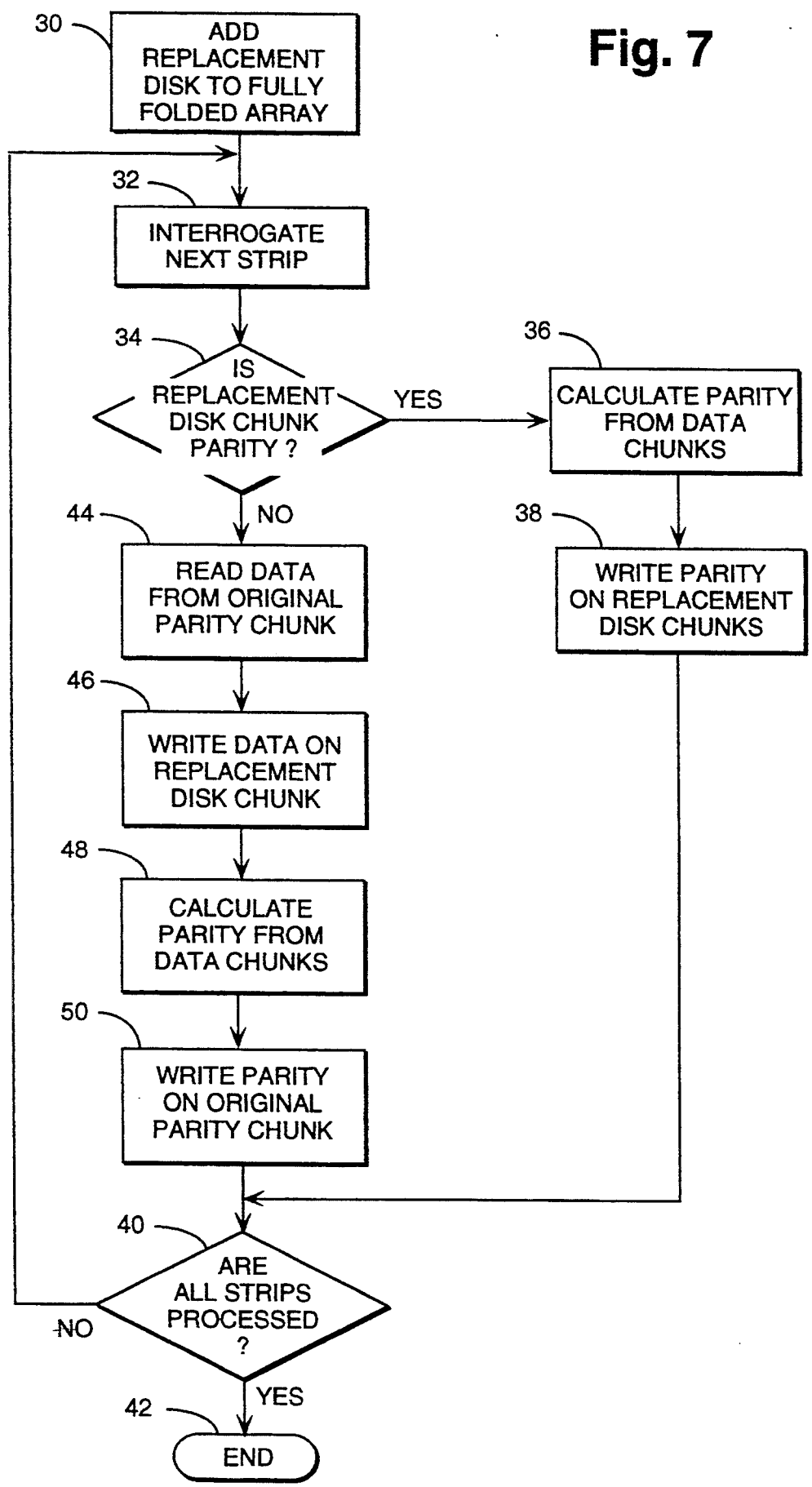
FIG. 7 is a flow chart for the process of unfolding a RAID array off-line.

The process for unfolding a fully folded RAID array off-line is set out in FIG. 7. After a replacement disk is added to a fully folded RAID array at step 30 in order to restore the array to a redundant state, the reorganization of data must be reversed. The unfolding proceeds one strip at a time by interrogating the next strip at step 32 and determining the nature of the first replacement chunk at step 34. If the replacement chunk is parity then the parity information is regenerated from the remaining data chunks at step 36. The regenerated parity is written on the replacement parity chunk at step 38 and the process now determines if all strips have been processed at step 40. If all strips have been processed, then the process ends at step 42. If there are remaining unprocessed strips, then the process loops back to step 32. If the replacement chunk is a data chunk, then the data currently stored on the chunk originally containing parity is read at step 44. The read data is written on the replacement disk chunk at step 46. Next, the parity for the strip is calculated from the data chunks at step 48. The new parity is written on the original parity chunk at step 50. The process now determines if all strips have been processed at step 40. If all strips have been processed, the process ends at step 42. If there are remaining unprocessed strips then the process loops back to step 32. The entire reorganization process described above is repeated for each strip in the array until all of the original data and parity chunks for the failed disk have been regenerated and written to the replacement disk.

Thus, in accord with the reorganization process, when a member disk of the RAID array fails, the data information that was stored on the failed member is regenerated using well known RAID algorithms and written to the locations on the remaining members that normally contain the corresponding parity information. Then after a replacement disk is added to a fully folded RAID array in order to restore the array to a redundant state, the reorganization of data must be revised. The unfolding process realigns the data to its original position in the strip and calculates the removed parity information and writes the parity information in its original chunk of the strip. In order to perform the above described reorganization on-line or concurrently with ongoing application access, state information must be maintained for each parity block or group of parity blocks, for each data block and for the array.

The state information for each parity block indicates whether the parity block contains (a) "parity" information, (b) "data" information from the failed member disk, or (c) "undefined" information. "Undefined" information is provided as a state value in order to prevent certain cases where the contents of the nominal parity block cannot be distinguished between data or parity information, since, in the event of certain failures during this state, undetected corruption of application data could occur were it not for the explicit indication that the interpretation of the information is undefined. The state information for a parity block is stored on the same disk as the corresponding parity block. The formation and use of state information for each parity block is described herein. A small fraction of the blocks of each disk are dedicated to storing bits that describe the state of each parity block. These bits are referred to as parity metadata (PMD). In the preferred embodiment two bits of parity metadata are used to describe the state of each parity block. In an alternative embodiment, one bit of parity metadata corresponds to a plurality of parity blocks. In another embodiment, the parity metadata comprises a list of the block numbers of each parity block that may contain invalid information. In yet another embodiment, the parity metadata comprises the block number of a parity block which may contain invalid information as a starting point and a range of additional parity blocks that may contain invalid information. In other alternative embodiments, the parity metadata can be encoded or mapped in different ways to represent the parity blocks which may contain invalid information. A metadata unit (MDU) is a collection of strips and the parity metadata that describes the state of all of the parity blocks in the strips. A strip is the collection of a parity chunk and all data chunks that contribute to it. A sequence of metadata units constitutes the RAID array. The collection of parity metadata that describes the state of all of the parity blocks in a single metadata unit is referred to as a PMD segment. The parity metadata is stored on the same disk as the parity blocks that it describes and "near" to the parity blocks that it describes. The term "near" is intended to refer to sequential access since the parity block and the parity metadata are accessed in close proximity in time. In the preferred embodiment, the metadata unit comprises a number of strips which together with the PMD segment occupy a cylinder on each of the disks in the array. A cylinder is a region of a disk any part of which can be accessed without a seek operation. In one embodiment, the metadata unit comprises six strips with the PMD segment between the third and fourth strip. Of course, any number of strips can be used and the PMD segment can be placed anywhere as a matter of design choice.

The state information for each data block of the array indicates whether the data block contains (a) "valid" information or (b) "invalid" information. The state information for a data block is stored on the same disk as the data block. The formation and use of state information for each data block is described herein. A number of blocks on each disk in the RAID-4 or RAID-5 array is allocated for storing data block state bits. One state bit is stored for every data block on the disk. Of course, one state bit could correspond to a group of data blocks. If the state bit is in a first or set state, the data on the associated block is invalid. If the state bit is in a second or clear state, the data on the associated block is valid.

Figure 8:
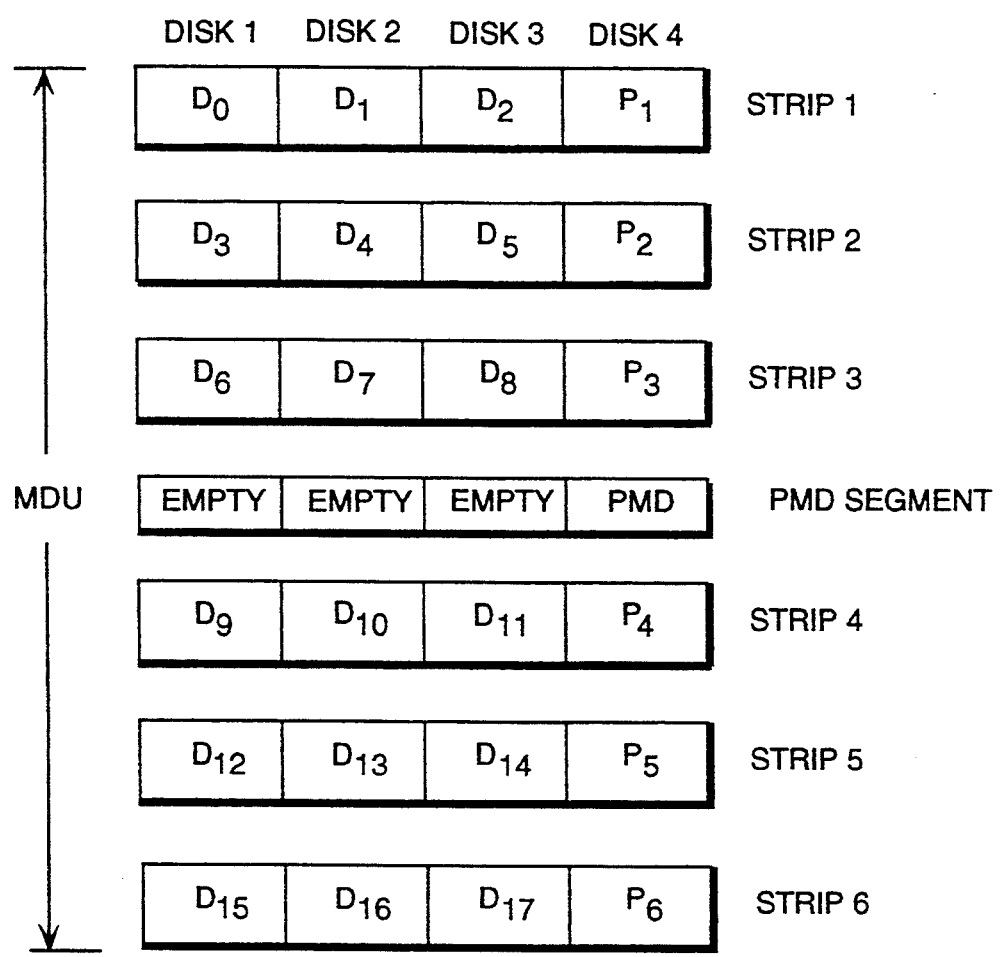
FIG. 8 is an illustration of the parity state bits or parity metadata for a RAID-4 array.

FIG. 8 illustrates a RAID-4 organization including a four disk array Disk 1 through Disk 4 with all of the parity information being recorded on Disk 4. Of course, any number of disks could be used in the array. In this embodiment six strips are combined into a metadata unit (MDU) with the parity metadata bits forming a PMD segment being recorded on Disk 4 in the middle of the strips. Each chunk of each strip is C blocks high and each strip contains 4C blocks of data or parity information. As is well known, the data blocks in Chunk $D_0$ are recorded on Disk 1, the data blocks in chunk $D_1$ are recorded on Disk 2, the data blocks in chunk $D_2$ are recorded on Disk 3, the parity blocks in chunk $P_1$ for the data blocks in chunks $D_0$, $D_1$ and $D_2$ is recorded on Disk 4, the data blocks in chunk $D_3$ are recorded on Disk 1 and so on. The parity metadata bits are recorded on Disk 4. Thus the parity metadata bits (PMD) are located on the same disk as corresponding parity blocks. Since there are C parity blocks per strip and six strips, there are 12C parity metadata bits or two parity metadata bits for each parity block. Of course, in an alternative embodiment, two parity metadata bits could correspond to more than one parity block.

In one embodiment, the parity metadata is one block high and located between the top three strips and the bottom three strips. The number of strips is a design consideration. In the preferred embodiment, the parity metadata bits are stored on the same disk as the associated parity blocks described and "near" the parity blocks of all the strips in the MDU. Having the parity metadata bits stored on the same disk as the associated parity block does not compromise data availability, since neither the parity block nor the parity metadata bits are useful without the other. Having the parity metadata bits stored "near" the associated parity block enhances performance, since the parity block and the parity metadata bits are accessed in close proximity in time. The term "near" is intended to be a relative indication of the seek time from the parity metadata bits to the parity blocks in the most remote strip in the MDU. Thus, the location of the PMD segment is a matter of design choice.

Figure 9:
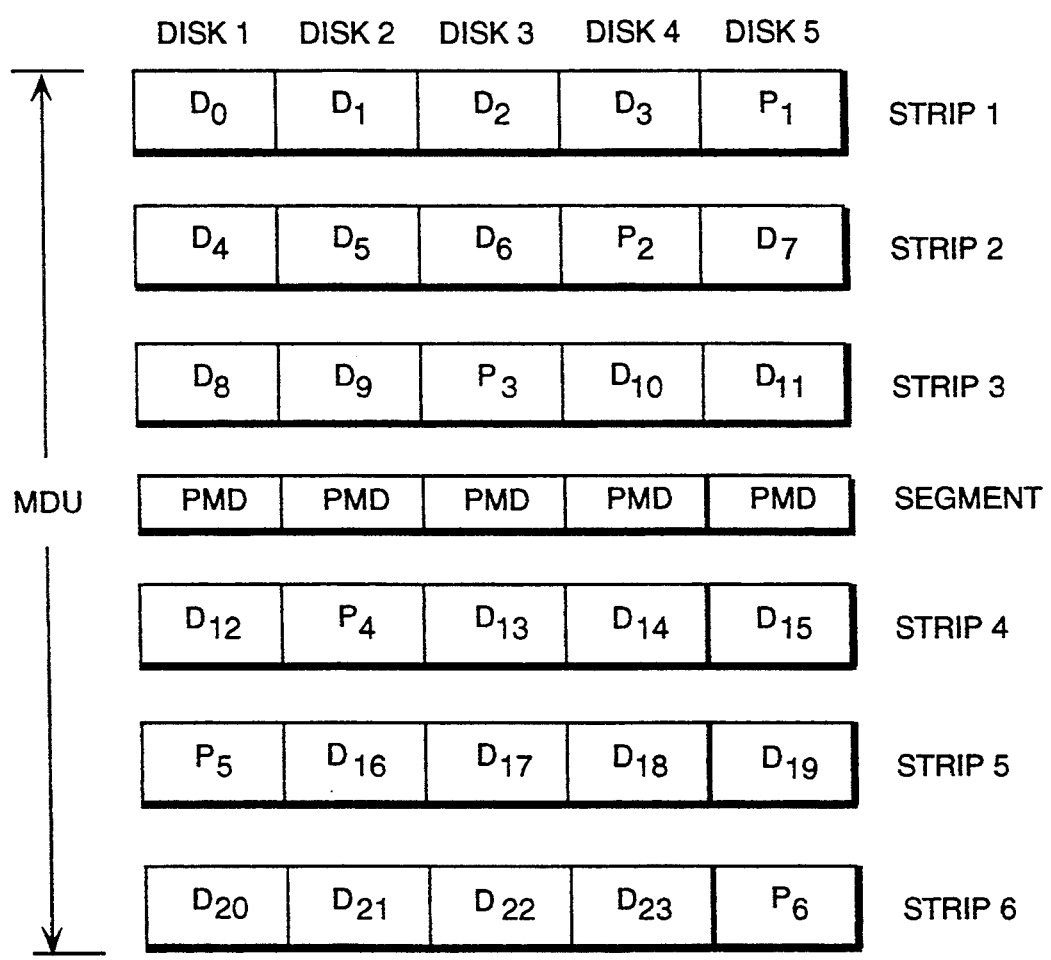
FIG. 9 is an illustration of the parity state bits or parity metadata for a RAID-5 array.

FIG. 9 illustrates a RAID-5 organization including a five disk array Disk 1 through Disk 5. The data is distributed over each disk in the array in the same manner as described above with respect to the RAID-4 organization in FIG. 8. In the RAID-5 organization the parity is also distributed over each disk in the array as is well known to one of ordinary skill in the field. In addition, there are various patterns of data and parity in successive strips that are well known and these differences are irrelevant to the present invention. The PMD segment containing the parity metadata is also distributed over each disk in the array. The parity metadata on Disk 1 corresponds to the parity chunk $P_5$ also on Disk 1. This sequence continues until Disk 5 which has parity metadata corresponding to the parity chunk $P_1$ and the parity chunk $P_6$. In this embodiment, the parity metadata is located between the top three strips and the bottom three strips.

Thus, in the preferred embodiment for either a RAID-4 or RAID-5 array, for each group of K successive strips, a number of blocks is allocated on each member of the array, sufficient in size to contain the parity metadata bits for each of the parity blocks on the member within the group of strips. These blocks containing the parity metadata bits are placed "near" the center of the group of K strips in order to minimize the logical distance between the parity metadata bits and the parity blocks associated therewith. The benefit of this arrangement is that for typical disks, increasing logical distance between successive accesses corresponds to increasing time for the successive accesses. However, the present invention is intended to encompass any relative placement of the blocks containing the parity metadata bits in relation to the parity blocks associated therewith and also includes the storing of the parity metadata bits in a cache for easy access as fully described hereinafter.

Figure 10:
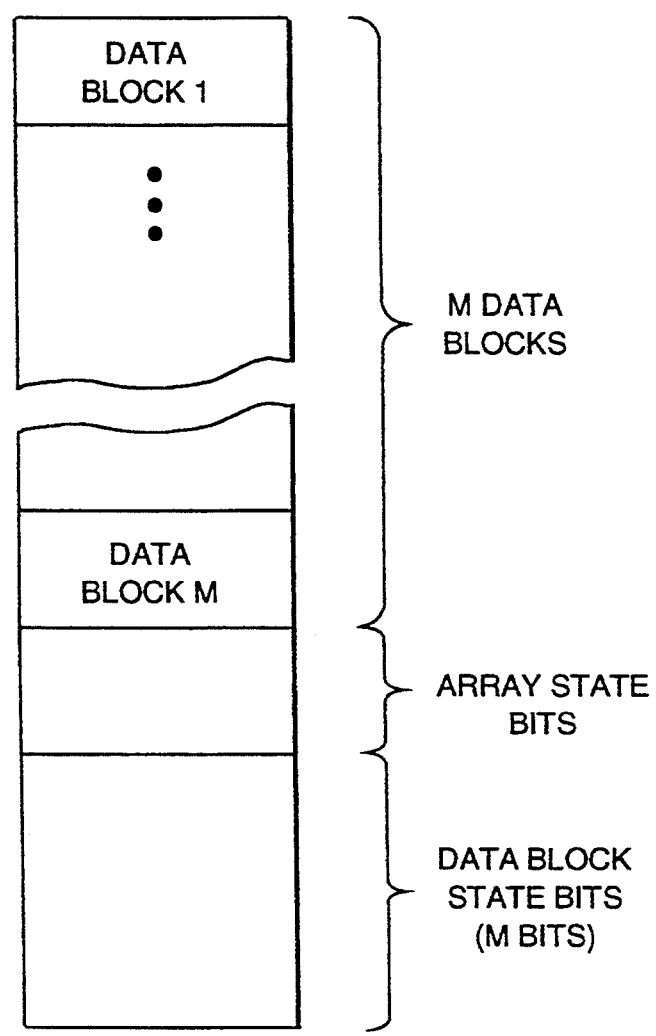
FIG. 10 is an illustration of the location of the block data state bits and the array state bits.

FIG. 10 is one disk of a RAID array illustrated as a linear space of blocks. If there are M blocks on the disk for data then enough blocks must be set aside to accommodate M data block state bits. While the blocks holding the state bits are illustrated at the last blocks of the disk, the state blocks can be located anywhere on the disk. For improved reliability, multiple copies of the state bits may be maintained. Each of the copies of the bits can be stored on the member disk whose blocks they described in a contiguous set of blocks. If multiple copies of these bits are maintained, all changes to the state of a bit must be performed to all copies before the change of state is considered complete.

The state information for the array as a whole includes the following: (a) Identity of the missing or replacement member disk and (b) Array state. The array state includes (a) "normal," all members of the array present; (b) "folding," a member of the array has failed and the folding process is in progress; (c) "fully folded," a member of the array has failed and the folding process is complete; and, (d) "unfolding," a replacement member has been added to the array and is being reconstructed. Therefore, when the array state is "normal" then no parity block has the state information of "data," when the array state is "fully folded" then no parity block has the state information of "parity" and when the array state is either "folding" or "unfolding" then each parity block may have the state information of "parity," "data" or "undefined." A number of blocks on each disk in the RAID-4 or RAID-5 array is allocated for storing array state bits. In the preferred embodiment, two array state bits identify the missing or replacement member disk and two additional array state bits identify the state of the array. FIG. 10 is one disk of a RAID array illustrated as a linear space of blocks. A block must be set aside to accommodate the array state bits. While the block holding the array state bits is illustrated towards the end of the disk, the state block can be located anywhere on the disk. The following table summarizes the possible combination of states for data blocks, parity blocks and the array.

TABLE 2

| STATE COMBINATIONS | | |
|---|---|---|
| Array State | Date Block State | Parity Block State |
| Normal | Valid | Parity |
|  | Invalid | Undefined |
| Folding | Valid | Parity |
|  | Invalid | Data |
|  |  | Undefined |
| Fully Folded | Valid | Data |
|  | Invalid | Undefined |
| Unfolding | Valid | Parity |
|  | Invalid | Data |
|  |  | Undefined |

Figure 11:
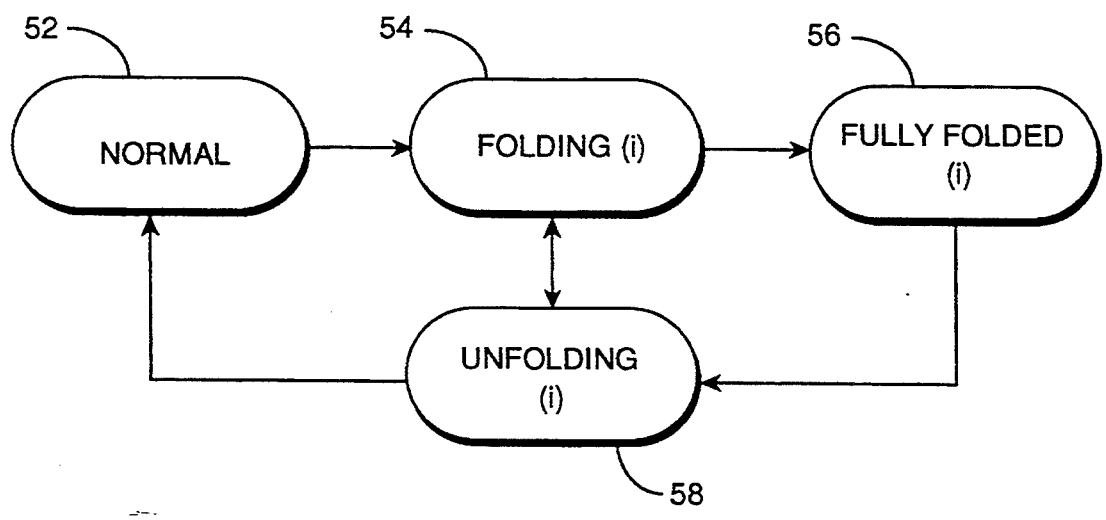
FIG. 11 is an illustration of the state transitions of the array according to the process of the present invention.

The state transitions of the array that the process of the present invention provides are illustrated in FIG. 11. The states followed by (i) indicate that the state exists with respect to the member (i) of the array. Transition is not permitted from a state followed by (i) to another state followed by (i) unless the member (i) with respect to which the state is defined is the same. Most significantly, the only way in which to transition from a state with respect to which one member of the array is defined to a state with respect to which another member of the array is defined is to go through the "normal" state 52. Thus, from the normal state 52 the process proceeds to the folding state 54. Now, as indicated above, the process for the same member (i) can proceed to the fully folded state 56 or to the unfolding state 58. If the process continues to the fully folded state 56, then for the same member (i) the process proceeds-to the unfolding state 58. Then for the same member (i) the process can continue to the folding state 54 or return to the normal state 52.

When the RAID array state is "normal," read and write I/O requests proceed in the standard manner for RAID-4 or RAID-5 arrays. When the RAID array state is "fully folded," read and write I/O requests proceed in the well known manner for a RAID-0 array. When the RAID array state is "folding" or "unfolding," read and write I/O requests proceed as described in detail hereinafter.

Several processes for writing to the array are described below in order to simplify the descriptions of the processing of the read and write I/O requests for the RAID array in either the "folding" or "unfolding" state. The modified read-modify-write (MRMW) process is defined as follows:

1. If either the target data block is invalid or the associated parity block is in the "undefined" or "data" state, terminate the process as having failed;
2. Set the parity block state to "undefined";
3. Perform the well-known read-modify-write process; and
4. If the update of both the data and parity has either not happened at all or has succeeded, set the parity block state to "parity" and set the data block state to "valid"; otherwise terminate the process as having failed and leave the state of the parity block as "undefined."

The modified reconstruct-write (MRW) process is defined as follows:

1. If any data block not a target of the write request and having the same associated parity block as some data block that is the target of the write request is in the "invalid" state, terminate the process as having failed;
2. Set the parity block state to "undefined";
3. Perform the well-known reconstruct-write process;
4. If the update of the data succeeded, then set the data block state to "valid"; and
4. If the update of both the data and parity has either not happened at all or has succeeded, set the parity block state to "parity"; otherwise terminate the process as having failed and leave the parity block in the "undefined" state.

The non-redundant write (NRW) process is defined as follows:

1. Write the data specified in the write request to the targeted data block; and,
2. If the write succeeded, set the state of the targeted data block to "valid."

A failed MRMW process may be able to be recovered by the use of the MRW process and a failed MRW process may be able to be recovered by a MRMW process. The failure of both MRMW and MRW then may be recovered by both setting the parity block to "undefined" and then applying the NRW. This recovery is considered to be part of each of these processes and will not be independently described or mentioned.

FIG. 12 is a flow chart that illustrates the process for a read I/O request according to the present invention. A read I/O request is initiated at a user or client application, such as CPU 18 in FIG. 1 and represented at step 60. The read I/O request is received by the RAID controller 16 at step 62. Next, the array state bits are interrogated at step 64. If the array state bits indicate that the array is in the "normal" state at step 66 then the read request is processed in the standard manner at step 68 including interrogating the state of each data block and treating as unreadable any block that has its state bit set to the "invalid" state and applying the well-known RAID recovery techniques. Then, the read data or an error signal is sent to the user application at step 70 and the read operation ends at step 72. If the array state bits indicate that the array is in the "folding" state at step 74 then the process proceeds to the read operation set forth in detail at FIG. 13. If the array state bits indicate that the array is in the "unfolding" state at step 76 then the process proceeds to the read operation set forth in detail at FIG. 14a. If the array state bits indicate that the array is in the "fully folded" state at step 78 then whether the target data is on the failed disk is determined at step 80. If the target data is on the failed disk, then read the target data from the parity chunk at step 72 interrogating the state of each data block and treating as unreadable any block that has its state bit set to the "invalid" state and send the read data to the user application at step 86 and the process ends at step 88. If the target data is not on the failed disk as determined at step 80 now the process proceeds with the standard I/O read at step 84, read data or an error signal is sent to user at step 86 and the process ends at step 88. All of the flow charts in the figures are set up to assume, for the sake of clarity, that each read, write, regenerate or copy operation is successful unless specifically illustrated to the contrary. If any of these operations are unsuccessful, then, as would be understood by one of ordinary skill in the art, the process loops to the next step. The process is described as a block by block operation for the sake of clarity of description. It is well-known to one of ordinary skill in the art that groups of blocks can be more practically be presented.

Figure 13:
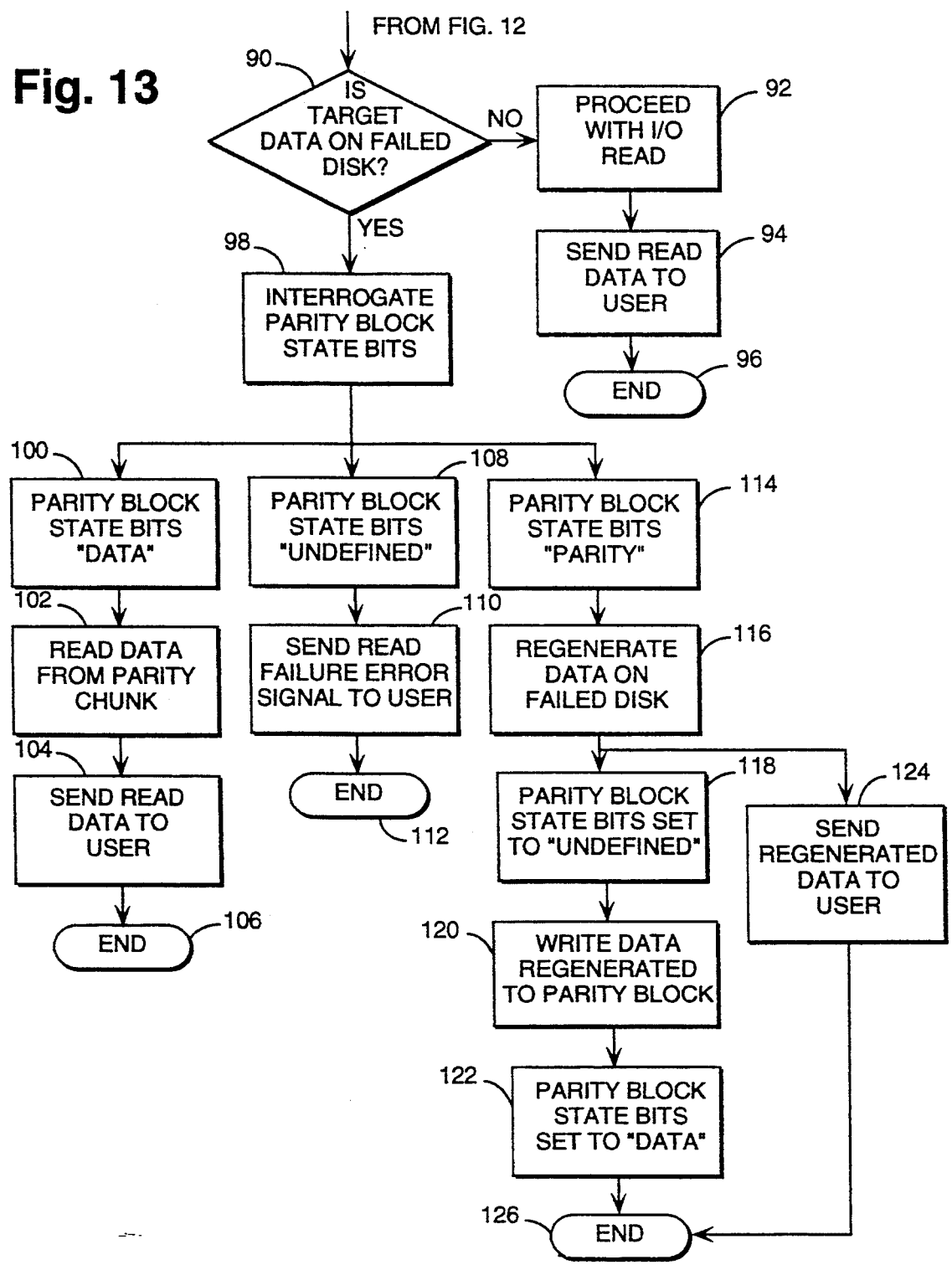
FIG. 13 is a flow chart illustrating the read operation when the array state is "folding" according to the present invention.

FIG. 13 is a flow chart that illustrates the read operation when the array state is "folding" in accord with the present invention. If the target data is not on the failed member or disk as determined at step 90 then the read request is processed in the standard manner at step 92. The read data or an error signal is sent to the user application at step 94 and the read operation ends at step 96. If the target data is on the failed disk or member as determined at step 90, then the parity block state bits are interrogated at step 98.

If the parity block state bits indicate that the parity block is in the "data" state at step 100 then regenerated data has already been written to the parity block and the target data is read from the parity block at step 102. The read data or an error signal is sent to the user application at step 104 and the read operation ends at step 106. If the parity block state bits indicate that the parity block is in the "undefined" state at step 108, then a read failure error signal is sent to the user application at step 110 and the read operation ends at step 112. If the parity block state bits indicate that the parity block is in the "parity" state at step 114, then the target data is regenerated using standard RAID algorithms at step 116. The parity block state bits are set to the "undefined" state at step 118. The regenerated target data is written to the parity block at step 120. Now, the parity block state bit is set to the "data" state at step 122. The regenerated target data is also sent to the user application at step 124 and the read operation ends at step 126.

Figure 14A:
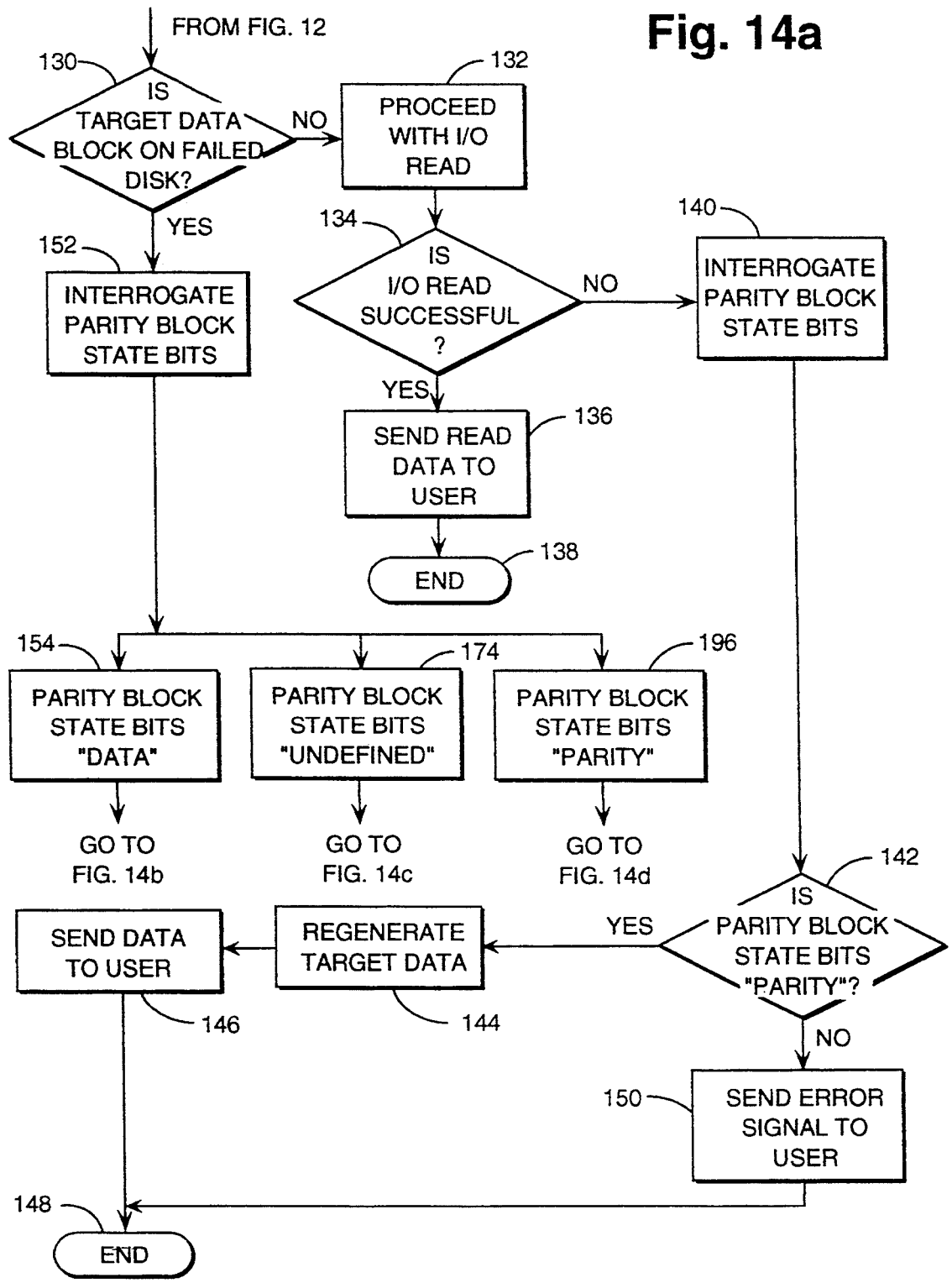

FIG. 14a is a flow chart that illustrates the process for a read I/O request when the array state bits indicate that the array is in the "unfolding" state according to the present invention. If the target data is not on the failed disk or member as determined at step 130, then the process proceeds to read the target data in the standard manner at step 132. If the I/O read is successful as determined at step 134, then the read data is sent to the user application at step 136 and the read operation ends at step 138. If the I/O read operation is not successful at step 134, then the parity block state is interrogated at step 140. If the parity block bits indicate that the parity block is in the "parity" state at step 142 then the target data is regenerated at step 144 and sent to the user application at step 146 and the read operation ends at step 148. Optionally, the regenerated data for step 144 can be written to the blocks whose read operation failed at step 134 to effect a repair. If the parity block bits do not indicate that the parity block is in the "parity" state at step 142, an error signal is sent to the user application at step 150 and the read operation ends at step 148.

Figure 14B:
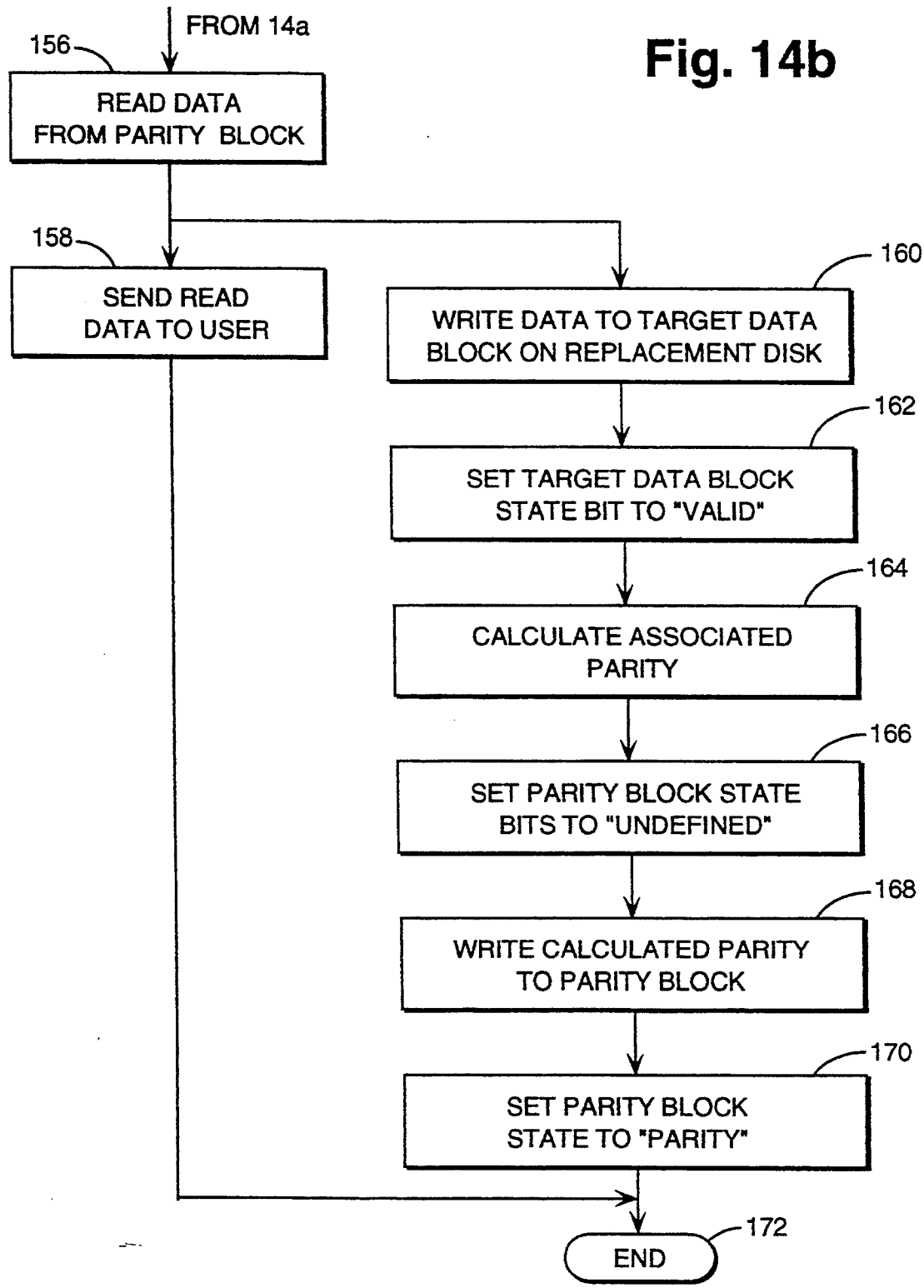

If the target data was originally on the failed disk or member as determined at step 130, then the parity block state bits are interrogated at step 152. If the parity block state bits indicate that the parity block is in the "data" state at step 154, then, as illustrated in FIG. 14b, the target data is read from the parity block at step 156 and sent to the user application at step 158. The target data is then written to the target data blocks on the replacement member at step 160. The data block state of the targeted data block is set to the "valid" state at step 162. The parity associated with the target data block is calculated at step 164 using standard RAID algorithms.

Next, at step 166 the parity block state bits are set to "undefined." Now, at step 168 the calculated parity is written to the parity block. The parity block state bits are set to the "parity" state at step 170 and the read operation ends at step 172.

Figure 14C:
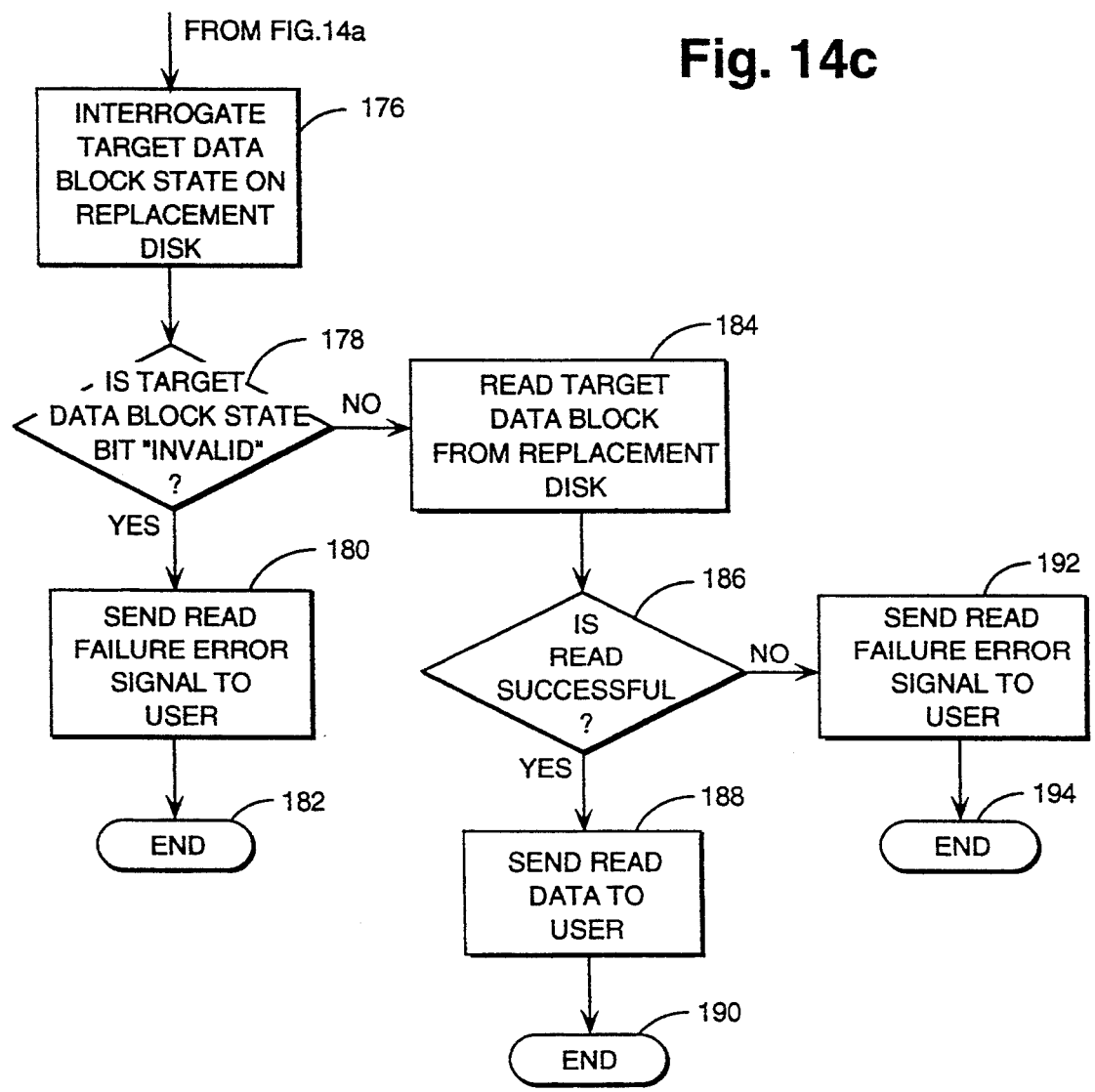

If the parity block state bits indicate that the parity block is in the "undefined" state at step 174 in FIG. 14a, then the data block state bit is interrogated at step 176 in FIG. 14c. If the target data block state bit is "invalid" as determined at step 178 a read failure error signal is sent to the user application at step 180 and the read operation ends at step 182. If the target data block state bit is valid as determined at step 178, then the target data is read from the replacement disk at step 184. If the read operation is successful as determined at step 186, the target data is sent to the user application at step 188 and the read operation ends at step 190. If the read operation is unsuccessful as determined at step 186, then a read failure error signal is sent to the user application at step 192 and the read operation ends at step 194.

If the parity block state bits indicate that the parity block is in the "parity" state at step 196 in FIG. 14a, the data block state bit is interrogated at step 198 in FIG. 14d. If the target data block state bit is in the "invalid" state as determined at step 200 then regenerate the target data at step 202. Now, the regenerated data is sent to the user application at step 204. In addition, the regenerated data is written to the target data block on the replacement disk at step 206. Now, the data block state bit is set to "valid" at step 208 and the read operation ends at step 210. If the target data block state bit is in the "valid" state as determined at step 200, then the target data is read from the replacement member at step 212. If the read from the replacement disk at step 212 is successful as determined at step 214, then the read data is sent to the user application at step 216 and the read operation ends at step 218. If the read operation is determined to be unsuccessful at step 214, then the target data is regenerated using the standard RAID algorithms at step 202. Then the regenerated data is sent to the user application at step 204 and written to the target data block on the replacement member at step 206. Since the data block state is already set to "valid" the read operation ends, at step 210.

Figure 15:
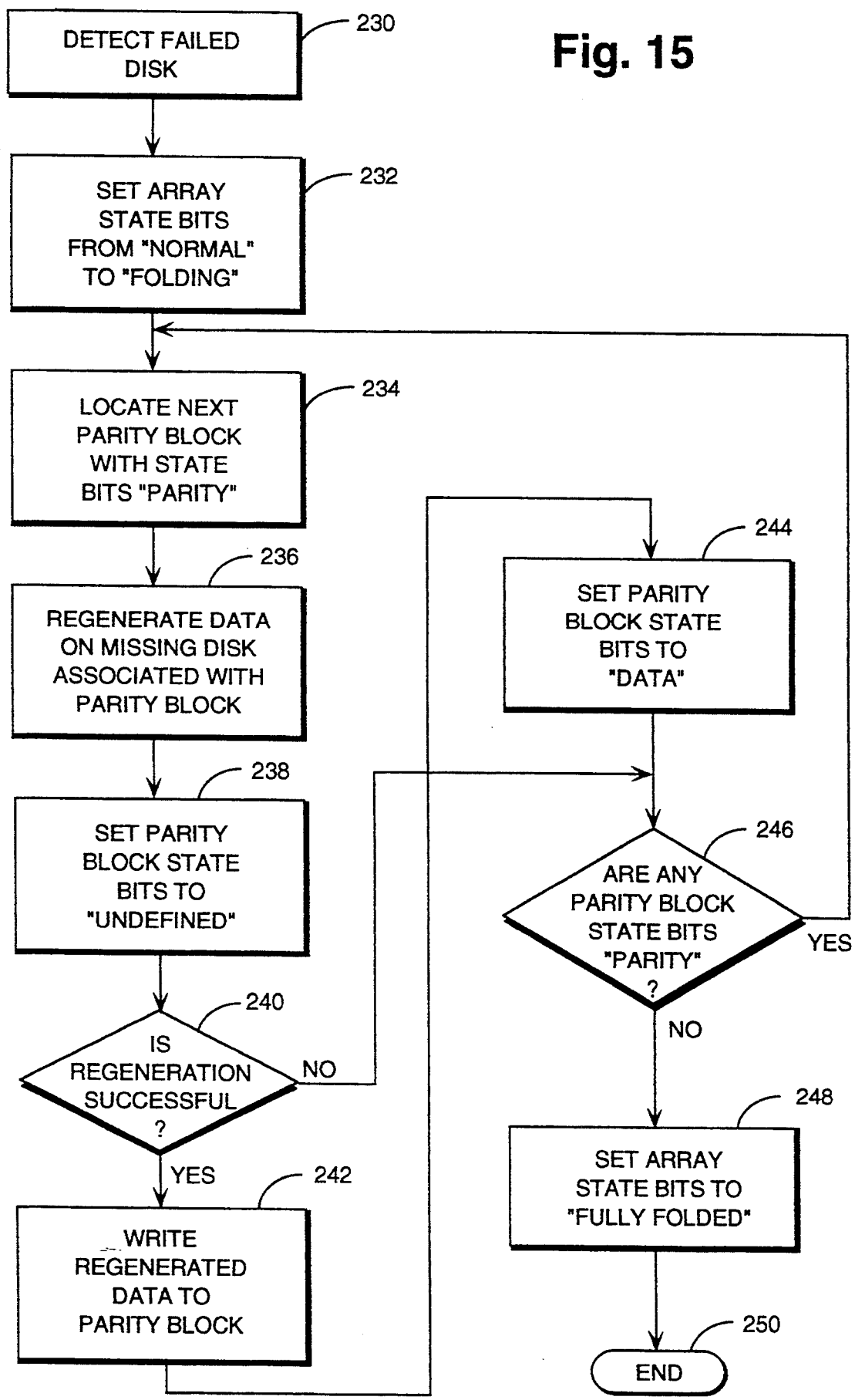
FIG. 15 is a flow chart illustrating the deliberate activity process to complete the "folding" operation according to the present invention.

FIG. 15 is a flow chart that illustrates the deliberate activity process to complete the "folding" operation which begins after a failed member is detected according to the present invention. A member failure is detected at step 230 and the array state bits are changed from indicating "normal" to indicating "folding" at step 232. Next, the process scans the disk locating the first parity block with state bits set to parity at step 234. Next, the data on the missing disk associated with the parity block is regenerated at step 236. The parity block state bits are set to indicate the "undefined" state at step 238. If the regeneration of the data is unsuccessful as determined at step 240, then the parity block state bits are left in the "undefined" state. The process loops forward to step 246 to determine if other parity blocks are in the parity state, and, if so, loop back to step 234 to continue processing.

If the data regeneration is successful as indicated at step 240, then regenerated data is written to the parity block at step 242 and the parity block state bits are set to indicate the "data" state at step 244. If there are any remaining parity blocks with state bits indicating the "parity" state the process loops back to step 234 to locate the parity blocks with the state bits set to indicate the "parity" state. If there are no remaining parity blocks with state bits indicating the "parity" state, the array state bits are set to indicate the "fully folded" state at step 248 and the process ends at step 250. The above process begins after a failed disk is detected at step 230 and runs concurrently with the I/O request driven process of FIG. 10 to drive the array from the "folding" state to the "fully folded" state. The rate at which the deliberate activity process proceeds described above determines the length of time that the array remains in the "folding" state and, as will be appreciated by those of ordinary skill in the field, the rate can be adjusted to modify the "folding" state time period.

Figure 16:
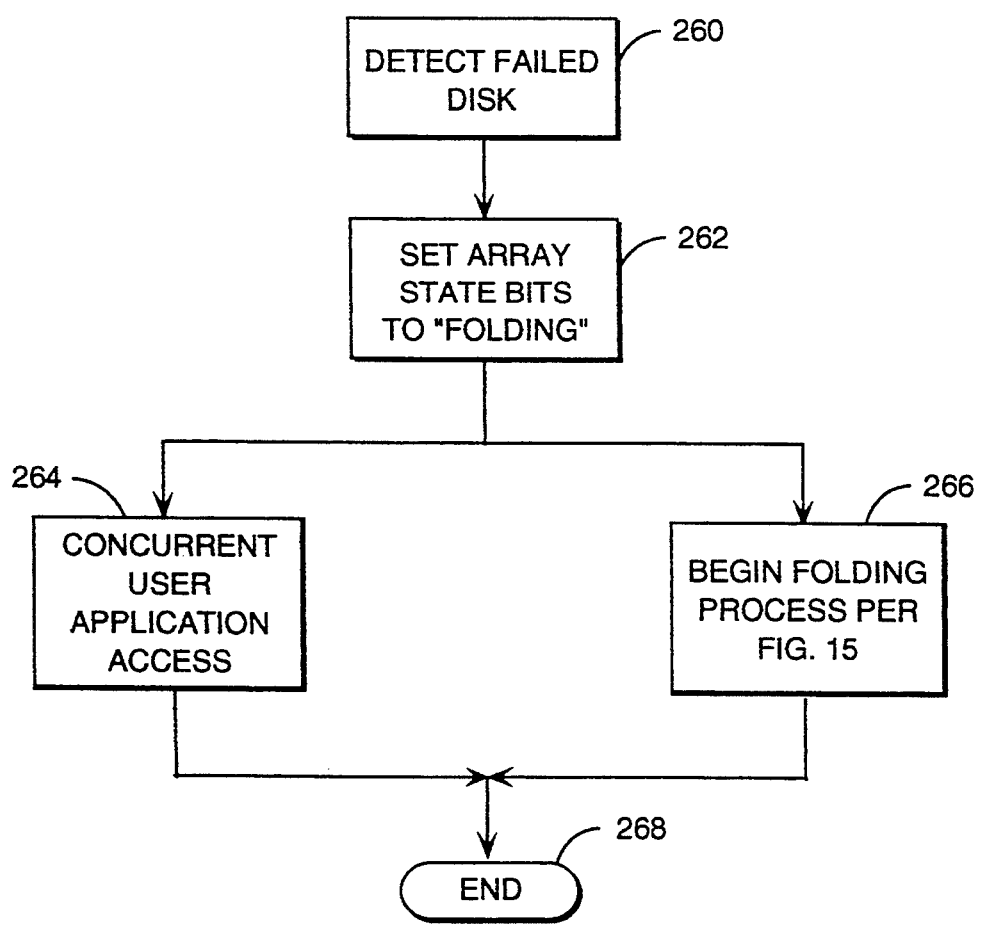
FIG. 16 is a flow chart of the overall operation of the system of the present invention during "folding."

FIG. 16 is an overall flow chart illustrating the concurrent user application access to the array and the deliberate process to complete the reorganization. A failed disk is detected at step 260, then the array state bits are set to "folding" at step 262. Now concurrent user application access is accomplished at step 264 and described in detail with respect to FIGS. 12 and 13 for read I/O requests and FIGS. 17 and 18 for write I/O requests. At the same time, the deliberate process to complete the reorganization proceeds at step 266 as described in FIG. 15 and in particular beginning at FIG. 15 step 234 and continues until completion at step 268. Since a "fully folded" array is the performance equivalent of a RAID-0 array, an alternative implementation would allow an array to be initialized in the "fully folded" state or deliberately transformed into the "fully folded" state to achieve the performance benefits of a RAID-0 array at the cost of the availability benefits of a RAID-5 array. Subsequently, the array in the "fully folded" condition would be brought back to the "normal" state to achieve the availability benefits of a RAID-5 array at the cost of the performance benefits of a RAID-0 array.

Figure 17:
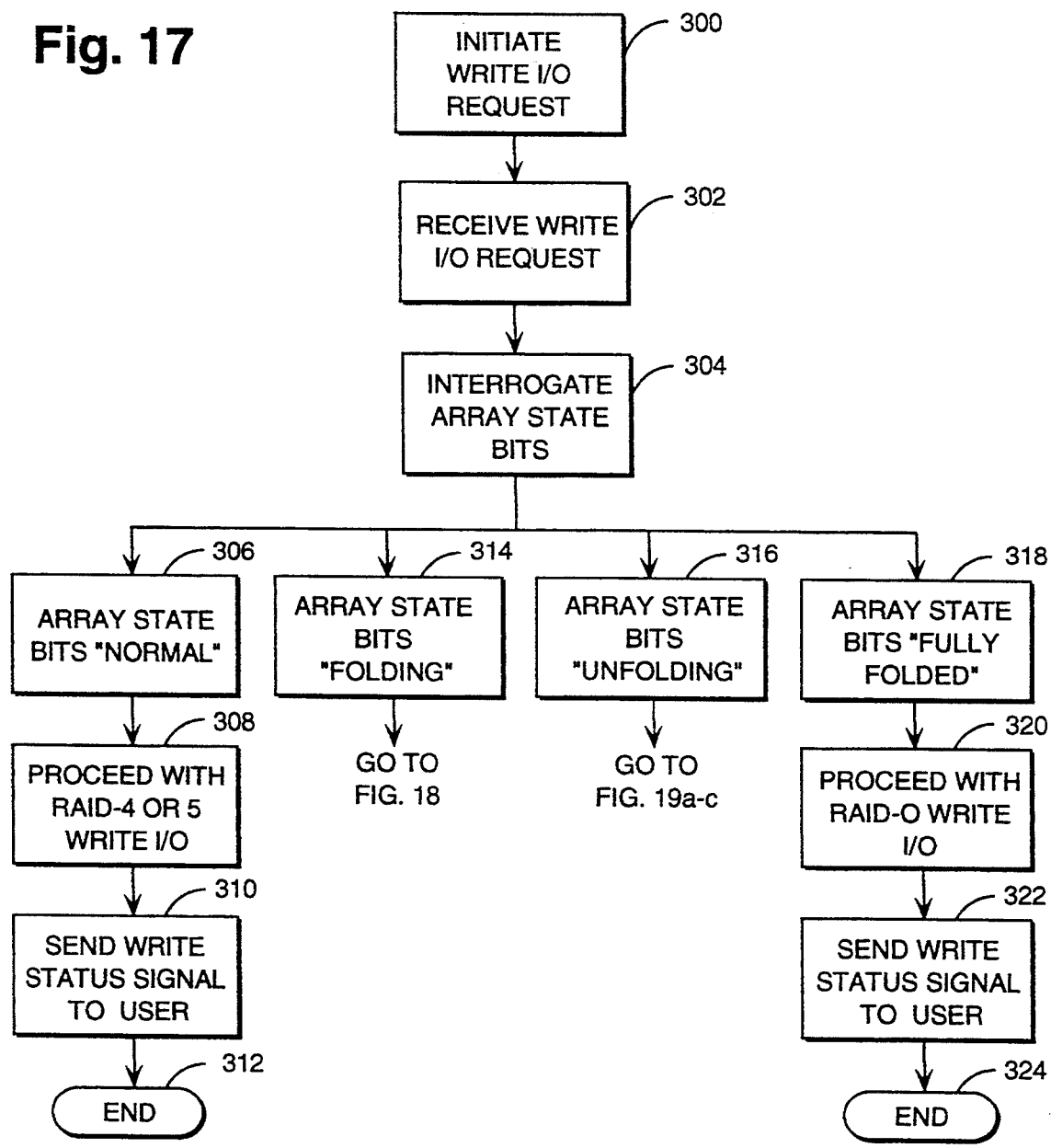
FIG. 17 is a flow chart illustrating the process according to the present invention for a write I/O request.

FIG. 17 is a flow chart that illustrates the process for a write I/O request according to the present invention. A write I/O request is initiated at a user or client application such as CPU 18 in FIG. 1 and is represented at step 300. The write I/O request is received by the RAID controller at step 302. Next, the array state bits are interrogated at step 304. If the array state bits indicate that the array is in the "normal" state at step 306, then the write request is processed using the MRW or MRMW algorithm at step 308 and a write status signal is sent to the user application at step 310 and the write process ends at step 312. If the array state bits indicate that the array is in the "folding" state at step 314, then the process proceeds to the write operation set forth in detail at FIG. 18. If the array state bits indicate that the array is in the "unfolding" state at step 316, then the process proceeds to the write operation set forth in detail at FIGS. 19a-c. If the array state bits indicate that the array is in the "fully folded" state at step 318, then proceed with the write operation at step 320 using the NRW algorithm and send a write status signal to the user application at step 322 and the write operation ends at step 324.

Figure 18:
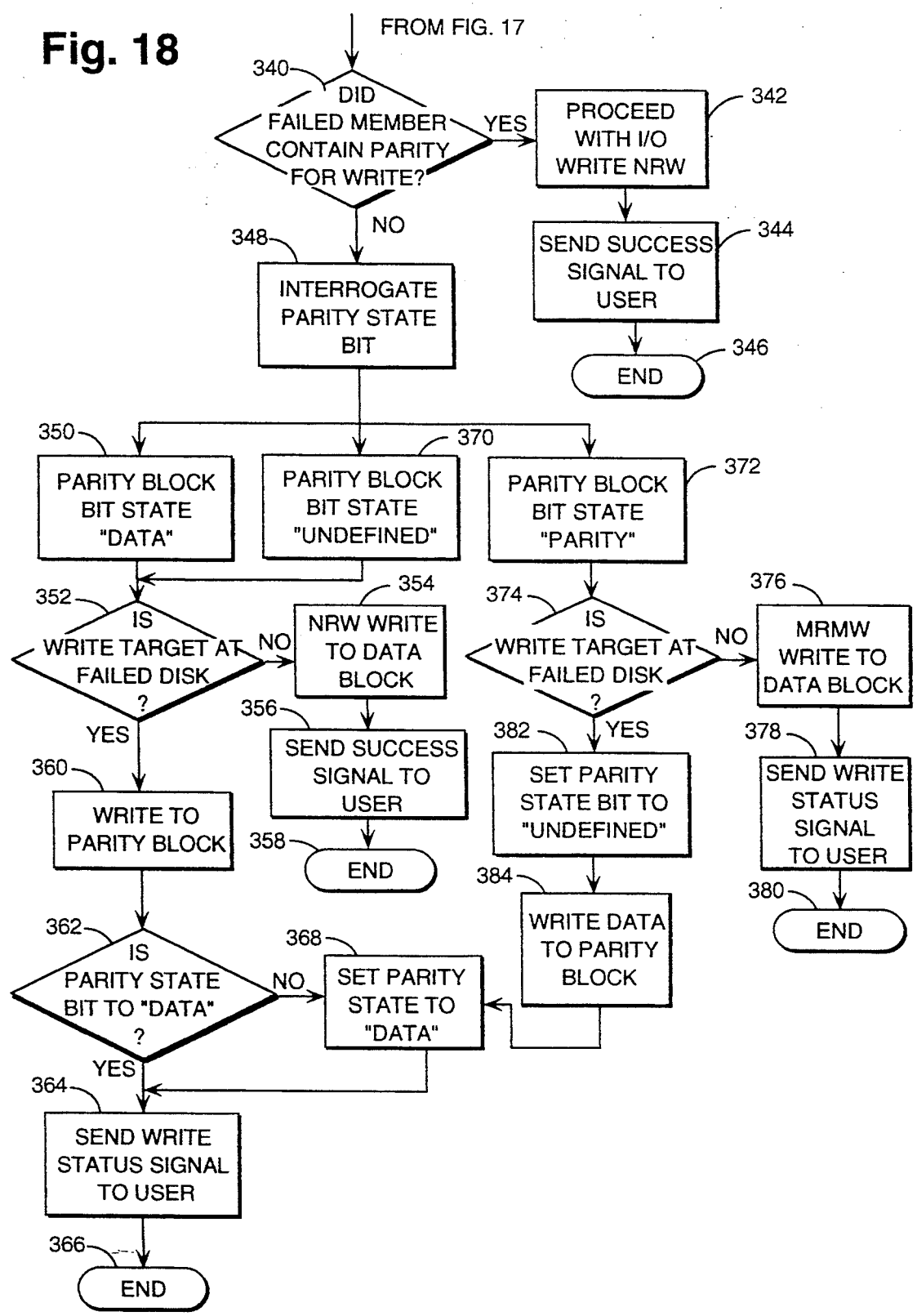
FIG. 18 is a flow chart illustrating the write operation when the array state is "folding" according to the present invention.

FIG. 18 is a flow chart that illustrates the write operation when the array state is "folding" in accord with the present invention. If the failed member contained parity for the target data block as determined at step 340, then proceed with the I/O write operation at step 342 using the non-redundant write operation. Next, send a write status signal to the user application at step 344 and the write operation ends at step 346. If the failed member did not contain parity for the target data block as determined at step 340, then interrogate the parity state bits at step 348.

If the parity state bits indicate that the parity state is "data" at step 350, then determine if the write target data block is on the failed disk at step 352. If the write target data block is not on the failed disk, then write to the target data block at step 354 using the non-redundant write operation. Now, send a write status signal to the user application at step 356 and the write operation ends at step 358. If the write target data block is on the failed member as determined at step 352, then write to the associated parity block at step 360. If the parity block state bits are set to "data" as determined at step 362, then send a write status signal to the user application at step 364 and the write operation ends at step 366. If the parity block state bits are not set to "data," then at step 368 set the parity block state bits to "data" and send a write status signal to the user application at step 364 and the write operation ends at step 366.

If the parity block state bits indicate that the parity block is in the "undefined" state at step 370, then the process proceeds to step 352 and continues as described above.

If the parity block state bits indicate that the parity block is in the "parity" state at step 372, then determine if the write target data block is on the failed disk at step 374. If the write target data block is not on the failed disk then write to the target data block at step 376 using the modified read-modify-write operation. Next, send a write status signal to the application user at step 378 and the write operation ends at step 380. If the write target data block is on the failed member as determined at step 374, then set the parity block state bits to the "undefined" state at step 382 and write the data to the parity block at step 384. Now the process loops to step 368 to set the parity block state bits to "data", then at step 368 set the parity block state bits to "data" and send a write status signal to the user application at step 364 and the write operation ends at step 366.

Figure 19A:
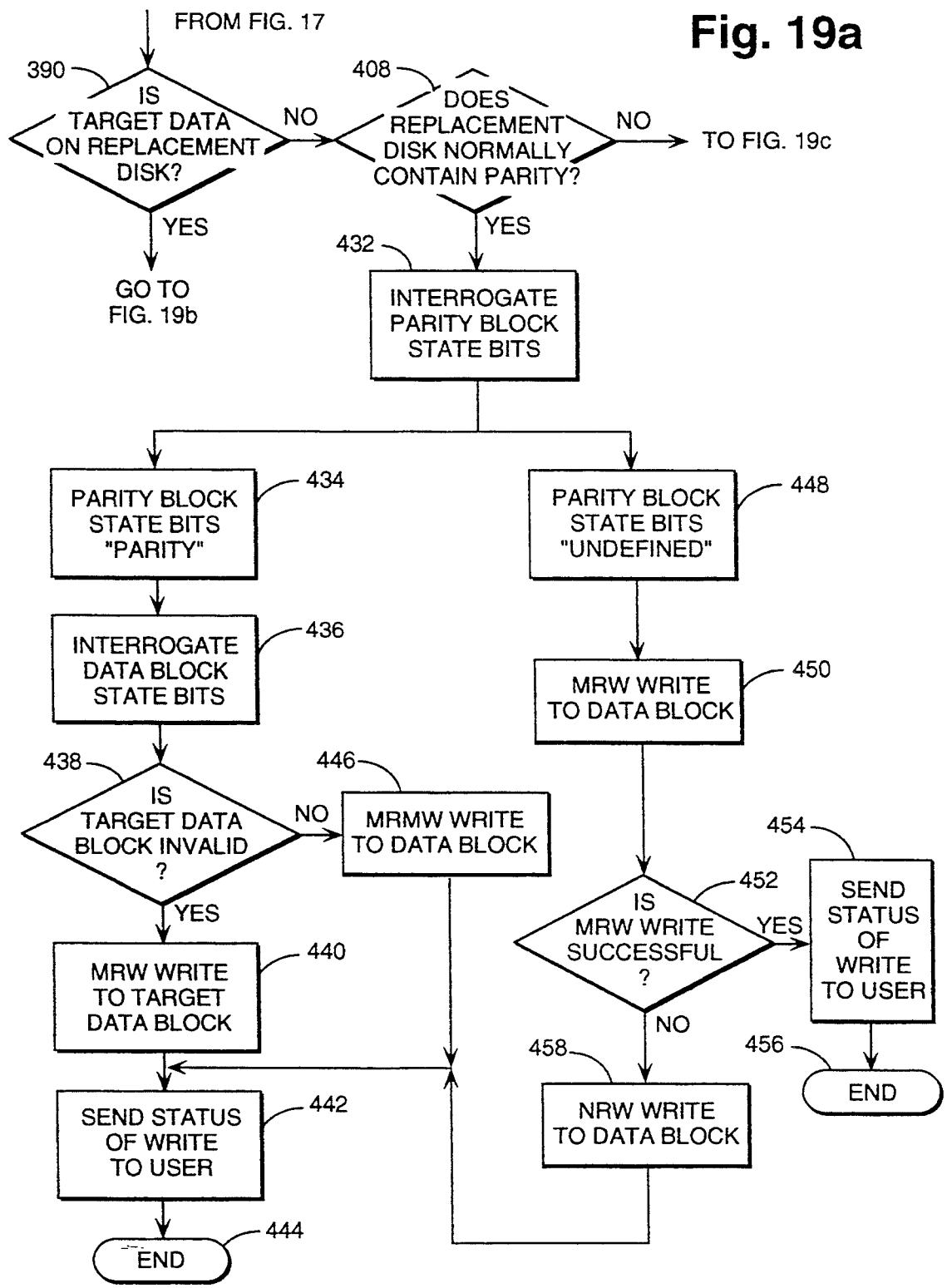

FIG. 19a is a flow chart that illustrates the process for a write I/O request when the array state bits indicate that the array is in the "unfolding" state according to the present invention. If the target write data block is on the replacement member as determined at step 390, then the process proceeds as set forth at FIG. 19b. If the target data block is not on the replacement disk as determined at step 390 and the replacement disk does not normally contain parity as determined at step 408 the process proceeds as set forth in FIG. 19c. Referring now to FIG. 19c, the parity block state bits are interrogated at step 392. If the parity block state bits indicate that the parity block is in the "data" state at step 394, then write to the target data block at step 396 using the non-redundant write operation. Alternatively at step 396 an MRW can be used if the data on the replacement disk is valid and, if necessary, then an NRW. Next, send a write status signal to the user application at step 398 and the write operation ends at step 400. If the parity block state bits indicate that the parity block is in the "undefined" state at step 402, then the process proceeds to step 396 as explained above. If the parity block state bits indicate that the parity block is in the "parity state" at step 404, then write to the target data block at step 406 using the modified read-modify-write operation or the MRW if appropriate. Now, send a write status signal to the user application at step 398 and the write operation ends at step 400.

Figure 19B:
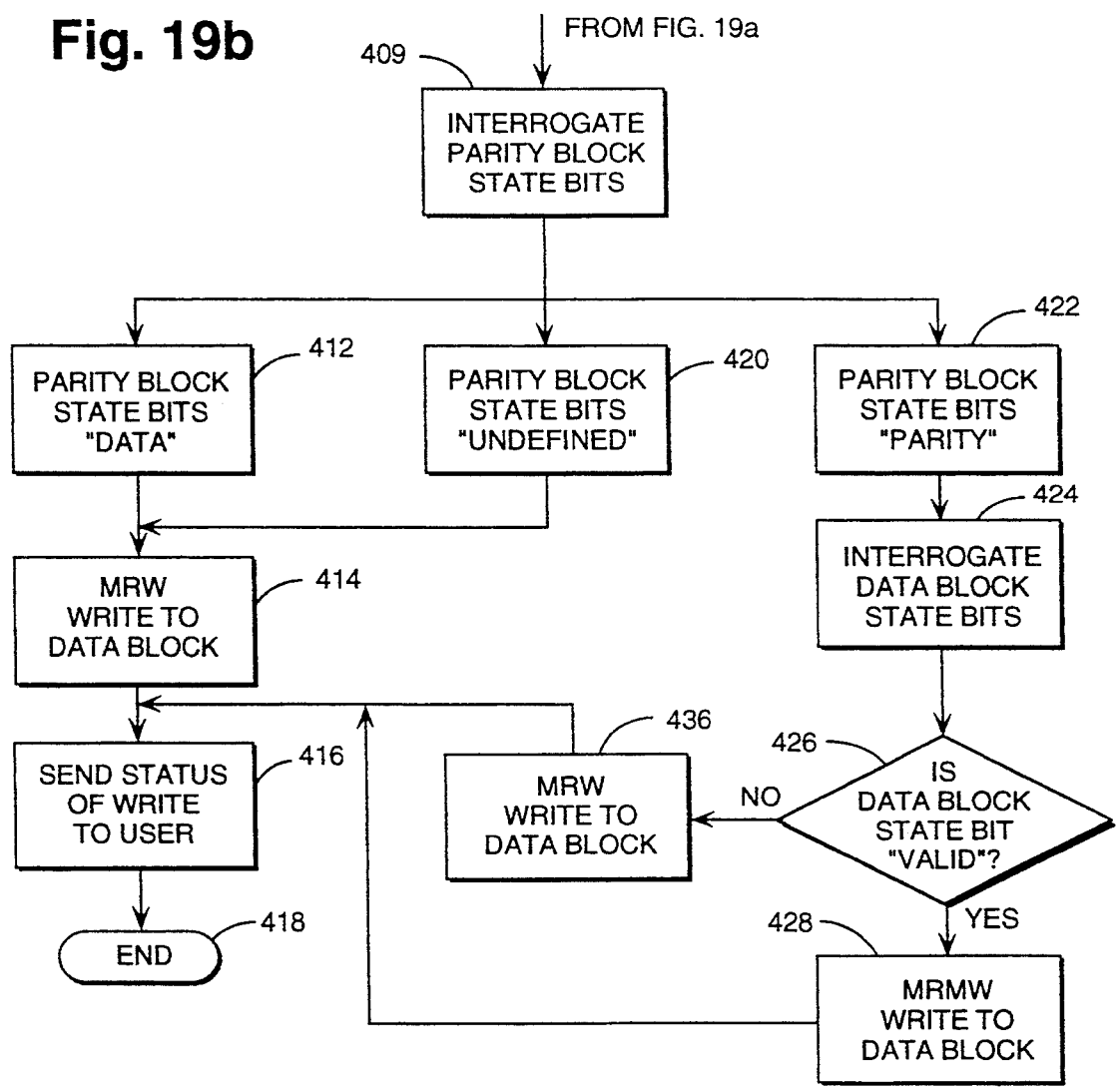
Figure 19C:
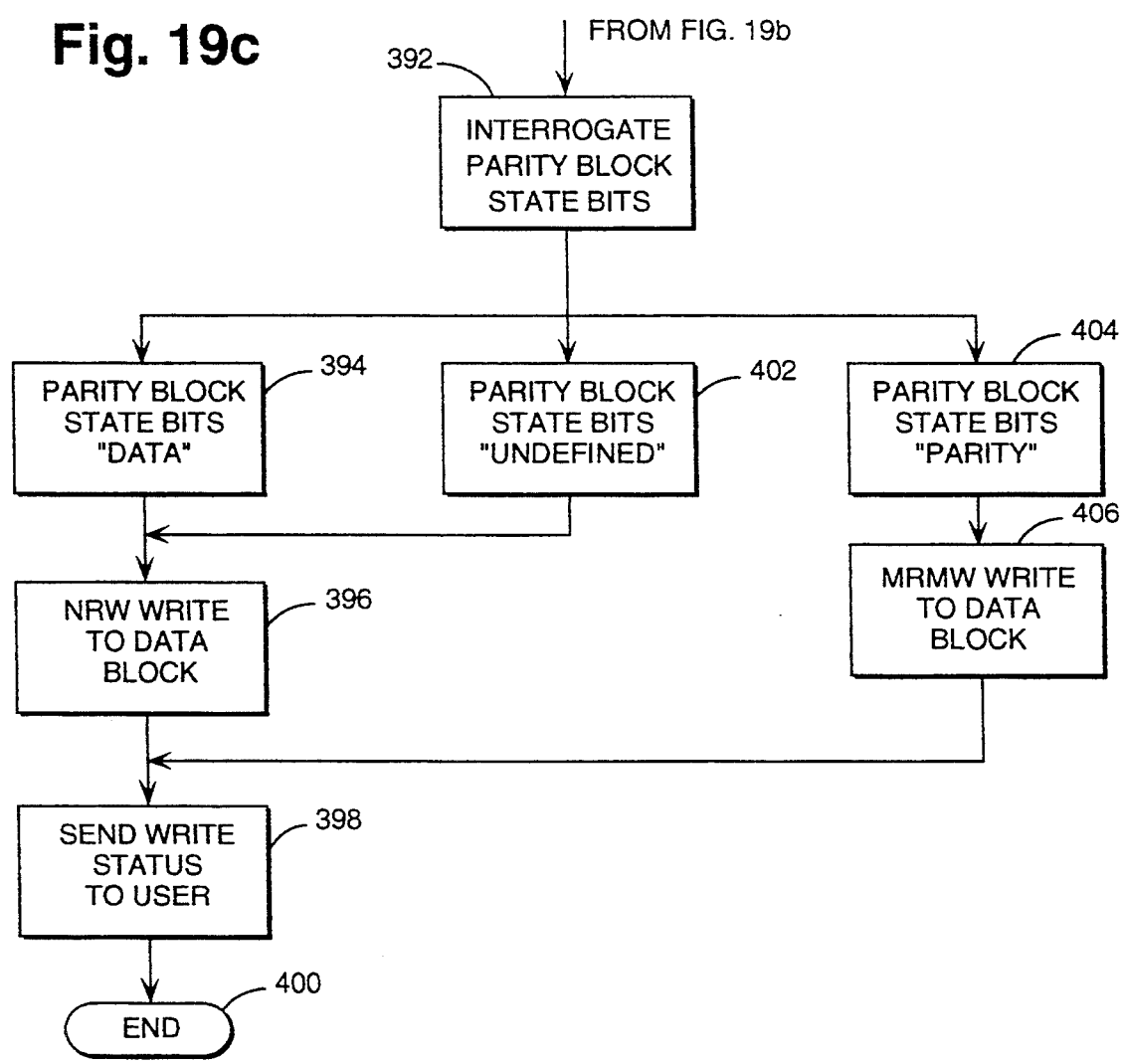

If the target data block is on the replacement disk as determined at step 390 in FIG. 19a, then the process proceeds to FIG. 19b. Now, at FIG. 19b interrogate the parity block state at step 409. If the parity block state bits indicate that the parity block is in the "data" state at step 412, then write to the target data block at step 414 using either the non-redundant write operation or the modified reconstruct write operation. The choice depends upon the relative precedence given to restoring the redundancy of the array versus servicing I/O requests. If we use the MRW operation at step 414 the parity block will contain the regenerated parity and the parity state will be set to "parity." As an alternative at step 414 if it is desired not to restore redundancy but to let the deliberate unfolding process do this, then an NRW operation could be used and if the parity block status bits are "data" the data is written to the parity block and the parity block status bits left at "data." This alternative allows the request to complete more quickly, but leaves the array non-redundant for a longer time. Now, send a write status signal to the user at step 416 and the write operation ends at 418. If the parity block state bits indicate that the parity block is in the "undefined" state at step 420, the process proceeds to step 414 as described above except if an NRW is used do not write the data to the parity block and also leave the parity state at "undefined." If the parity block state bits indicate that the parity block is in the "parity" state at step 422, then the state of the data block is interrogated at step 424. If the data block state bit is in the valid state as determined at step 426, then write to the data block at step 428 using the modified read-modify-write operation or MRW operation if appropriate. Now, a write status signal is sent to the application user at step 416 and the write operation ends at step 418. If the data block bit is in the "invalid" state as determined at step 426, then write to the target data block at step 430 using the modified reconstruct-write operation. Now, send a write status signal to the user application at step 416 and the write operation ends at 418.

Now returning to FIG. 19a, if the replacement disk normally contains parity as determined at step 408, then interrogate the parity block state bits at step 432. If the parity block state bits indicate that the parity block is in the "parity state" at step 434, then interrogate the target data block state bit at step 436. If the target data block state bit is in the invalid state as determined at step 438, then write to the target data block at step 440 using the modified reconstruct-write operation. Now, send a write status signal to the application user at step 442 and the write operation ends at step 444. If the target data block state bit is in the "valid" state as determined at step 438, then write to the target data block at step 446 using the modified read-modify-write operation. Now, send a write status signal to the application user at step 442 and the write operation ends at step 444.

If the parity block state bits indicate that the parity block is in the "undefined" state at step 448, then write to the target data block at step 450 using the modified reconstruct write operation. Now, determine if the modified reconstruct write operation was successful at step 452. If the MRW operation was successful then send a write status signal to the application user at step 454 and the write operation ends at step 456. If the MRW operation is not successful, then at step 458 write to the data block using the non-redundant write operation and then send a write status signal to the application user at step 442 and the write operation ends at step 444.

Figure 20A:
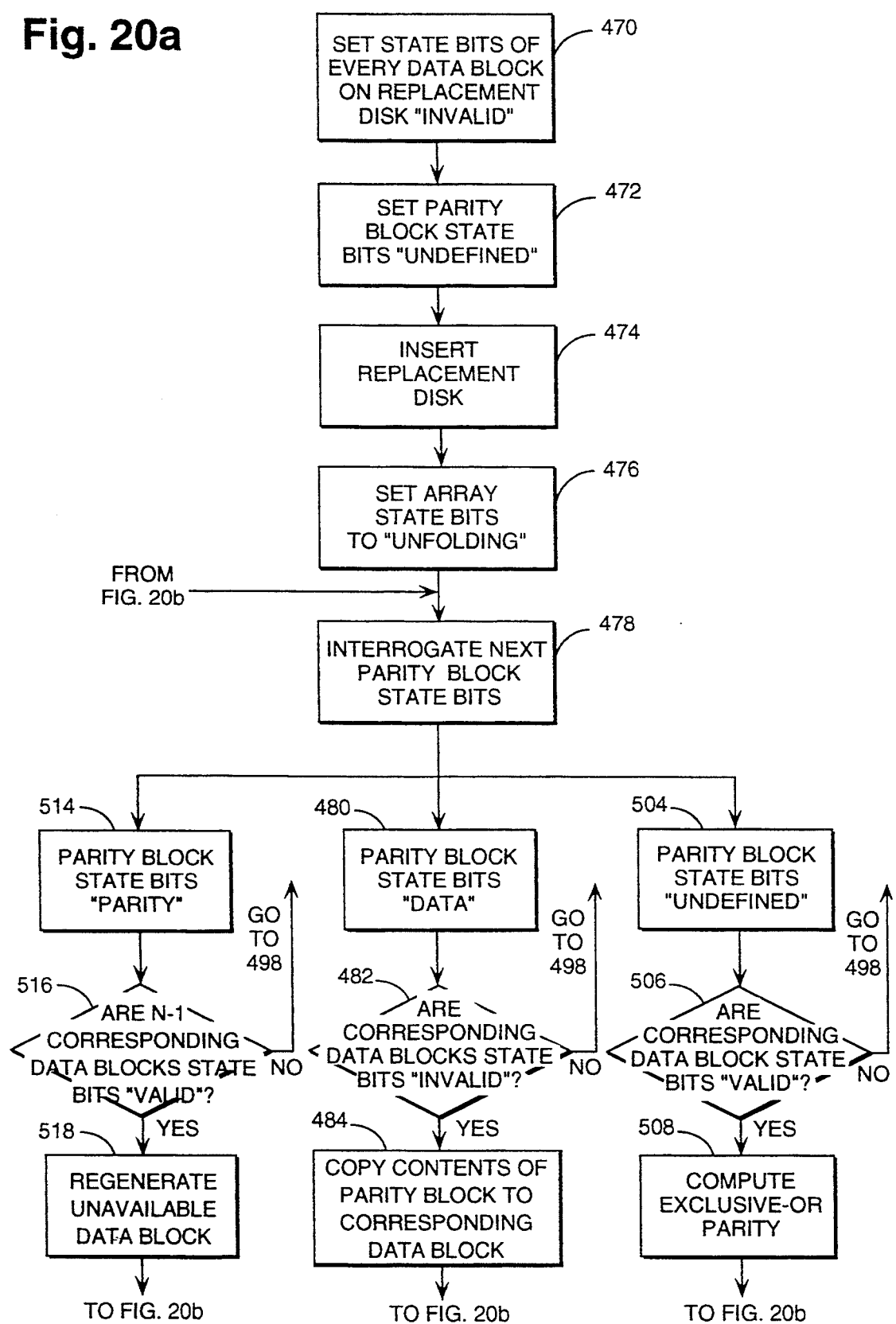
FIGS. 20a–b are flow charts illustrating the deliberate activity process to complete the "unfolding" operation according to the present invention.
Figure 20B:
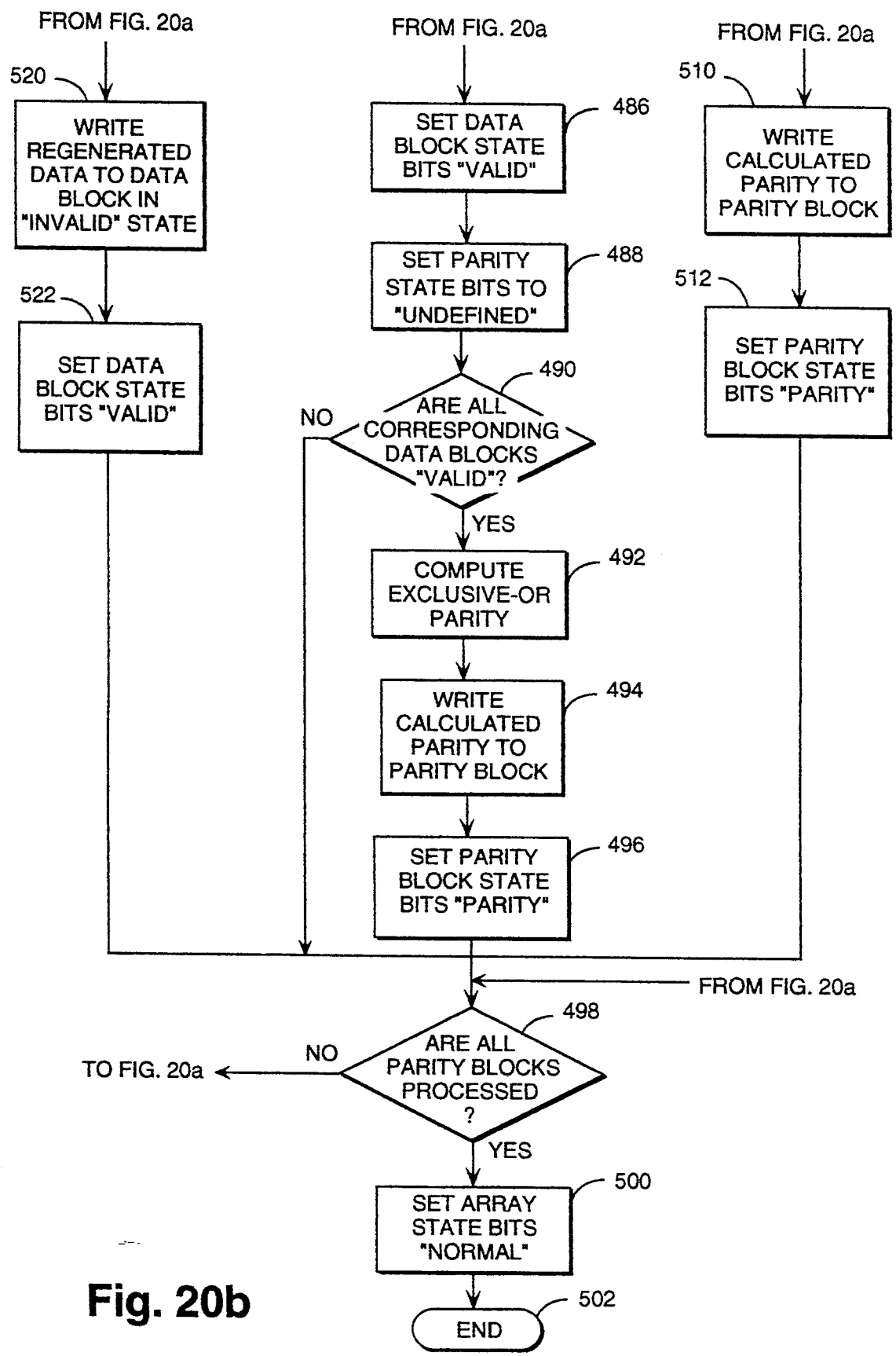

FIGS. 20a and 20b are flow charts that illustrate the deliberate activity process to complete the "unfolding" operation which begins when a replacement disk is added to a fully folded array or an array in the folding state according to the present invention. At step 470, set every data block state bit on the replacement member to the "invalid" state and at step 472 set every parity block state bit on the replacement disk to the "undefined" state. Now, at step 474, insert the replacement disk and set the array state bits to the "unfolding" state at step 476. Now at step 478 interrogate the next parity block state within a strip. If the next parity block state bit indicates "data" at step 480, then determine if the data block state of the corresponding data block on the replacement member is in the "invalid" state at step 482. If the corresponding data block state is valid, then the process proceeds back to the step 498 in FIG. 20b and another parity block is located. If the corresponding data block state is invalid at 482, then at step 484 copy the contents of the parity block to the corresponding data block on the replacement disk. At step 486 in FIG. 20b set the state of the data block to "valid." Now at step 488, set the parity state bits to "undefined." Now, at step 490, determine if all corresponding data blocks are "valid." If all data blocks are "valid" compute the parity using Exclusive-OR at step 492. Then at step 494 write the calculated parity to the parity block and set the parity block state to "parity" at step 496. Now proceed to step 498 to determine if all parity blocks have been processed and, if so, set the array state bits to "normal" at step 500 and the process ends at step 502 and, if not, the process loops back to step 478 in FIG. 20a to interrogate the next parity block state. If all the corresponding data blocks were not valid at step 490, then proceed to step 498.

If the next parity block state is "undefined" at step 504 in FIG. 20a then at step 506 determine if all of n corresponding data blocks are all in the "valid" state. If not, the process proceeds to step 498 in FIG. 20b as described above. If all n corresponding data blocks are in the "valid" state as determined at step 506, then compute the Exclusive-OR of these data blocks at step 508 and write the result to the parity block at step 510. Now, if the parity block write is successful, set the state of the parity block to "parity" at step 512. Now at step 498, determine if all strips have been processed and, if so, set the array state to "normal" at step 500 and, if not, the process loops back to step 478 to interrogate the next parity block state.

If the next parity block state is "parity" at step 514, then at step 516 determine if exactly n − 1 of the n corresponding data blocks are in the "valid" state and, if not, the process loops back to step 498 in FIG. 20b as described above to locate another qualifying parity block and, if yes, then compute the Exclusive-OR of the parity block and the n − 1 data blocks at step 518. Normally the invalid block will be on the replacement disk but this process will serve to regenerate data for any failed block or strip. Now write the result to the one data block in the invalid state at step 520 in FIG. 20b and at step 522 set the data block state bits to "valid". Now, at step 498 determine if all strips have been processed and, if so, set the array state to "normal" at step 500 and, if not, the process loops back to step 478 to interrogate the next parity block state.

Figure 21:
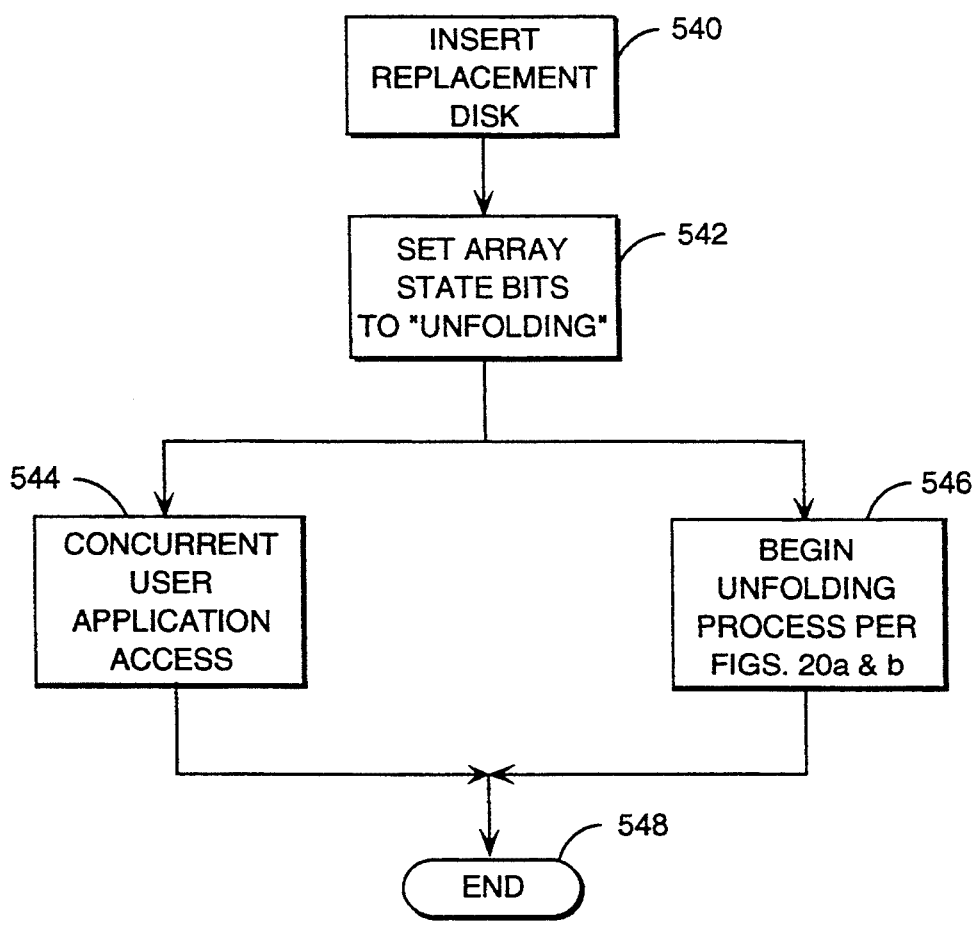
FIG. 21 is a flow chart of the overall operation of the system of the present invention during "unfolding."

FIG. 21 is an overall flow chart illustrating the concurrent user application access to the array and the deliberate process to complete the reorganization. A replacement disk properly prepared as described above is inserted into the array at step 540, then the array state bits are set to "unfolding" state at step 542. Now, concurrent user application access is accomplished at step 544 and described in detail with respect to FIGS. 14a–d for a read I/O request and FIGS. 19a–c for a write I/O request. At the same time, the deliberate process to complete the reorganization proceeds at step 546 as described in FIGS. 20a and 20b and in particular beginning at FIG. 20a step 478 and continues until completion at step 548.

Under some circumstances, a member of a RAID-4 or RAID-5 array will appear to fail, be removed from the array and within a modest time interval become available again with a very high confidence that the contents of the disk have not been changed or lost since it appeared to fail and was removed from the array. This situation can occur, for example, if the communications path to the affected disk drive or the controller for the affected disk drive suffers a temporary failure which takes sufficiently long to recover that the disk is removed from the array.

In accord with the methods of the present invention described above, a disk that was recently removed from the array, such that the array is still in the "folding" state with respect to that failed member disk, can be restored to the array by an expedited process. The expedited process involves a modified preparation of the replacement disk followed by exactly the "unfolding" method described above. The expedited process works since the "folding" process described above captures the identity of the data blocks that have been written since the failure and removal of the member since these data blocks are identified by the fact that the associated parity block has its parity block status bits set to "data."

Figure 22:
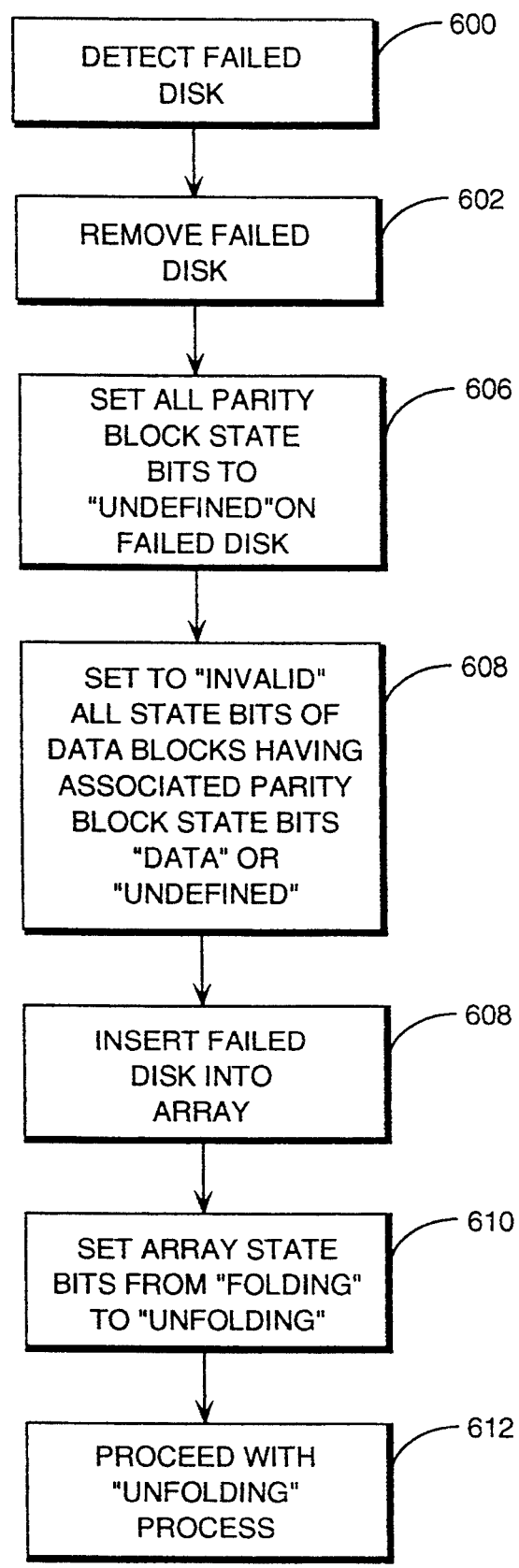
FIG. 22 is a flow chart illustrating the process for the replacement of a recently removed disk according to the present invention.

The preparation procedure for the replacement of the recently removed disk is illustrated in FIG. 22. The failed disk is detected at step 600 and removed from the array at step 602. Now, all of the parity block state bits associated with parity blocks on the replacement member are set to "undefined" at step 604. Next, at step 606, all of the data block state bits associated with a data block on the replacement member that has an associated parity block with parity block state bits in the "data" or "undefined" state are set to the "invalid" state. The replacement disk is now inserted into the array at step 608 and the array state bits are set from the "folding" to "unfolding" state at step 610 then the process continues with the unfolding process at step 612 as described above in FIG. 20a. The efficiency of this expedited replacement process increases as the number of members of the array increases and the quicker the failed disk is restored to the array.

Alternative embodiments of the present invention are possible by re-encoding of the state information described above. Each data and parity block has associated therewith a state bit having a "valid" state and an "invalid" state. In addition, each parity block also has associated therewith a second state bit having a first state indicating that data is present, referred to as the "data" state and a second state indicating that parity information is present, referred to as the "parity" state.

The relationship between the parity block states in the preferred embodiment and those in this alternative is shown in the following table:

TABLE 3

| PARITY BLOCK STATE COMPARISON | |
|---|---|
| Original State | Re-Encoded State |
| "Parity" | "Parity" and "Valid" |
| "Data" | "Data" and "Valid" |
| "Undefined" | ("Data" or "Parity") and "Invalid" |

This information of the parity block state yields identical results as described in the preferred embodiment. The processes remain the same except where obvious modification is needed to accommodate the re-encoded state. Such modification is within the ability of one of ordinary skill in the art and, accordingly, not described in detail.

A second alternative embodiment of the present invention involves a different, more redundant re-encoding of the state information. Each data and parity block has an associated state bit having a first or "valid" state and a second or "invalid" state. In addition, each parity block has associated state bits indicating either "data," "parity" or "undefined." The relationship between the parity block states in the preferred embodiment and those in this alternative is shown in Table 4.

TABLE 4

| PARITY BLOCK STATE COMPARISON | |
|---|---|
| Original State | Re-Encoded State |
| "Parity" | "Parity" and "Valid" |
| "Data" | "Data" and "Valid" |
| "Undefined" | ("Data" or "Parity") and "Invalid" or "Undefined" and ("Valid" or "Invalid") |

This information of the parity block state yields identical results as described in the preferred embodiment. The processes remain the same except where obvious modification is needed to accommodate the re-encoded state. Such modification is within the ability of one of ordinary skill in the art and, accordingly, not described in detail.

One benefit of this embodiment with its added redundancy is that it more clearly separates the less frequently changing "valid"/"invalid" state information from the rapidly changing "data"/"parity"/"undefined" state information. The more rapidly changing "data"/"parity"/"undefined" state information is stored "near" to the parity information that it describes and which is accessed in close proximity in time. The relatively infrequently changing "valid"/"invalid" state information is stored in aggregate in some location on the disk.

A method of improving the performance and availability of a RAID-4 or RAID-5 array when a member disk has failed and has not yet been replaced has been described. The method provides on-line reorganization of a RAID-4 or RAID-5 array into the equivalent of the higher performance and reliability RAID-0 organization in the event of the failure of a member. The on-line reorganization is accomplished as a result of user application access to the array in a manner that speeds subsequent application access to the same part of the array and a deliberate reorganization activity concurrent with application access in a manner that drives the reorganization to completion at a rate that preserves some level of performance for application access. The method also provides on-line restoration of the RAID-4 or RAID-5 organization subsequent to the failure of a member using a replacement member. The on-line restoration is accomplished as a result of user application access to the array at a low incremental cost and a deliberate reorganization activity that drives the reorganization to completion at a rate that balances the objectives of high performance application access to the array and full restoration of the redundancy that characterizes a RAID-4 or RAID-5 organization. The method further provides an expedited process for restoring a disk to an array from which it was recently removed due to a temporary failure of the controller for the disk or the path to the disk. All of the above is accomplished without unusual or unique requirements of the disk drives that constitute the membership of the array or of their individual controllers.

What is claimed is:

1. A method of on-line reorganization of data in a storage system having n+1 disks arranged in a RAID array when one of said disks falls while preserving concurrent access to said array by a user application, each of said disks in said storage system having a plurality of data blocks, a plurality of parity blocks, each parity block associated with n data blocks, a plurality of groups of parity block state bits, each group of parity block state bits indicating that said associated parity block contains parity information or data or the contents are undefined, and a group of array state bits indicating the condition of the array as "normal," "folding," "fully folded" or "unfolding," said method comprising the steps of:

(a) receiving a read request from said user application to read a targeted data block;
(b) interrogating said array state bits to determine the condition of said array;
(c) if said array state bits indicate said array is in said "normal" state, then proceeding with a read operation;
(d) if said array state bits indicate said array is in said "folding" state, then proceeding with a "folding" read operation;
(e) if said array state bits indicate said array is in said "fully folded" state, then proceeding with a "fully folded" read operation; and
(f) if said array state bits indicate said array is in said "folding" state, then also proceeding with a deliberate process to complete said reorganization concurrently with user application access to said array.

2. The method of on-line reorganization of data in a storage system as set forth in claim 1 wherein said "folding" read operation comprises the following steps:

(g) determining if said targeted data block of said read request is on said failed disk;
(h) if said targeted data block is not on said failed disk, then proceeding with a read operation;
(i) if said targeted data block is on said failed disk, then interrogating the state bits of the parity block associated with said targeted data block;
(j) if said parity block state bits indicate said parity block is in said data state, then reading data from said parity block and send said read data to said user application;
(k) if said parity block state bits indicate said parity block is in said undefined state, then sending a read failure signal to said user application; and
(l) if said parity block state bits indicate said party block is in said parity state, then regenerating said targeted data block, sending said regenerated data to said user application, setting said parity block state bits to said undefined state, writing said regenerated data to said parity block and setting said parity block state bits to said data state.

3. The method of on-line reorganization of data in a storage system as set forth in claim 2 wherein said deliberate process comprises the following steps:

(m) locating a parity block with state bits indicating said parity state;

(n) regenerating said data block on said failed disk associated with said located parity block;

(o) setting said state bits of said located parity block to said undefined state;

(p) writing said regenerated data block to said located parity block;

(q) setting said state bits of said located parity block to said data state;

(r) repeating steps (m) through (q) until all parity blocks with said state bits indicating said parity state are processed; and then (s) setting said array state bits to indicate said array is in said "fully folded" state.

4. A method of on-line reorganization of data in a storage system having n+1 disks arranged in a RAID array when one of said disks fails while preserving concurrent access to said array by a user application, each of said disks in said storage system having a plurality of data blocks, a plurality of data block state bits, each data block state bit associated with one of said data blocks, and having a first state indicating that said associated data block may contain invalid information and a second state indicating that said associated data block contains valid information, a plurality of parity blocks, each parity block associated with n data blocks, a plurality of groups of parity block state bits, each group of parity block state bits indicating that said associated parity block contains parity information or data or the contents are undefined, and a group of array state bits indicating the condition of the array as "normal," "folding," "fully folded" or "unfolding," said method comprising the steps of:

(a) receiving a read request from said user application to read a targeted data block;

(b) inserting a replacement disk;

(c) interrogating said array state bits to determine the state of said array;

(d) if said array state bits indicate said array is in said "unfolding" state, then proceeding with an "unfolding" read operation and proceeding with a deliberate process to complete said reorganization concurrently with user application access to said array.

5. The method of on-line reorganization of data in a storage system as set forth in claim 4, wherein said "unfolding" read operation comprises the following steps:

(e) determining if said targeted data block of said read request is on said failed disk;

(f) if said targeted data block is not on said failed disk, then proceeding with a read operation;

(g) if said targeted data block is on said failed disk, then interrogating said parity block state bits for the associated parity block;

(h) if said parity block state bits indicate said parity block is in said data state, then, (1) reading data from said parity block and sending said read data to said user application;

(2) writing said read data to said targeted data block on said replacement disk;

(3) setting said data block state bit for said target data block to said valid state;

(4) calculating parity information associated with said targeted data block;

(5) setting said parity block state bits of said associated parity block to said undefined state;

(6) writing said calculated parity information to said associated parity block; and (7) setting said parity block state bits of said associated parity block to said parity state;

(i) if said parity block state bits indicate said parity block is in said undefined state, then, (1) interrogating said targeted data block on said replacement disk;

(2) if said state bits of said targeted data block indicate said targeted data block is in said invalid state, then sending a read failure signal to said user application;

(3) if said state bits of said targeted data block indicate said targeted data block is in said valid state, then reading said targeted data block from said replacement disk and sending said read data to said user application;

(j) if said parity block state bits indicate said parity block is in said parity state, then, (1) interrogating said state bits of said targeted data block on said replacement disk;

(2) if said state bit of said targeted data block indicates said target data block is in said valid state, then reading said targeted data block from said replacement disk and sending said read data to said user application;

(3) if said state bit of said targeted data block indicates said target data block is in said invalid state, then regenerating said data block, sending said regenerated data block to said user application, writing said regenerated data block to said replacement disk and setting said state bit of said targeted data block to said valid state.

6. The method of on-line reorganization of data in a storage system as set forth in claim 5, wherein said deliberate process comprises the following steps:

(k) setting said state bits for every one of said data blocks on said replacement disk to said invalid state;

(l) setting said state bits for every one of said parity blocks on said replacement disk to said undefined state;

(m) setting said array state bits to said "unfolding" state;

(n) interrogating the parity block state bits of one of said parity blocks;

(o) if said parity block state bits indicate said parity block is in said parity state and said corresponding n−1 data block state bits indicate said n−1 data blocks are in said valid state, then regenerating said targeted data block, writing said regenerated data block to said replacement disk and setting said data block state bits for said data block to said valid state;

(p) if said parity block state bits indicate said parity block is in said data state and the corresponding data block state bit indicates said data block is in said invalid state, then copying the contents of said parity block to the corresponding data block on said replacement disk, and setting said data block state bit to said valid state; and (1) if said state bits for all corresponding data blocks are in the valid state, then calculating the associated parity, writing said calculated parity to said parity block, setting said parity block state bits to said parity state;

(2) if said state bits for all corresponding data blocks are not in said valid state, then setting said parity block state bits to said undefined state;

(q) if said parity block state bits indicate said parity block is in said undefined state and said corresponding data block state bits are in said valid state, then calculating the associate parity, writing said calculated parity to said parity block, and setting said parity block state bits to said parity state; and (r) determining if all parity blocks have been processed, if not, repeating steps (n) through (q) and, if so, setting said array state bits to said "normal" state.

7. A method of on-line reorganization of data in a storage system having n+1 disks arranged in a RAID array when one of said disks fails while preserving concurrent access to said array by a user application, each of said disks in said storage system having a plurality of data blocks, a plurality of parity blocks, each parity block associated with n data blocks, a plurality of groups of parity block state bits, each group of parity block state bits indicating that said associated parity block contains parity information or data or the contents are undefined, and a group of array state bits indicating the condition of the array as "normal," "folding," "fully folded" or "unfolding," said method comprising the steps of:

(a) receiving a write request from said user application to write to a targeted data block;

(b) interrogating said array state bits to determine the condition of said array;

(c) if said array state bits indicate said array is in said "normal" state, then proceeding with a write operation;

(d) if said array state bits indicate said array is in said "folding" state, then proceeding with a "folding" write operation;

(e) if said array state bits indicate said array is in said "fully folded" state, then proceeding with a "fully folded" write operation; and (f) if said array state bits indicate said array is in said "folding" state, then also proceeding with a deliberate process to complete said reorganization concurrently with user application access to said array.

8. The method of on-line reorganization of data in a storage system as set forth in claim 7 wherein said "folding" write operation comprises the following steps:

(g) determining if said failed disk contains the parity data block associated with said targeted data block;

(h) if said failed disk contained said associated parity block, then proceeding with a write operation;

(i) if said failed disk did not contain said associated parity block, then interrogating said state bits of said associated parity block;

(j) if said parity block state bits indicate said parity block is in said data state or said undefined state, then, (1) determining if said target data block is on said failed disk;

(2) if said target data block is not on said failed disk, then proceeding with a NRW write operation;

(3) if said target data block is on said failed disk, then writing to said parity block and setting said parity block state bits to said data state;

(k) if said parity block state bits indicate said parity block is in said parity state, then, (1) determining if said target data block is on said failed disk;

(2) if said target data block is not on said failed disk, then proceeding with a RMW write operation;

(3) if said target data block is on said failed disk, then setting said parity block state bits to said undefined state, writing to said parity block, and setting said parity block state bits to said data state.

9. The method of on-line reorganization of data in a storage system as set forth in claim 7 wherein said deliberate process comprises the following steps:

(l) locating a parity block with state bits indicating said parity state;

(m) regenerating said data block on said failed disk associated with said located parity block;

(n) setting said state bits of said located parity block to said undefined state;

(o) writing said regenerated data block to said located parity block;

(p) setting said state bits of said located parity block to said data state;

(q) repeating steps (l) through (p) until all parity blocks with said state bits indicating said parity state are processed; and then (r) setting said array state bits to indicate said array is in said "fully folded" state.

10. A method of on-line reorganization of data in a storage system having n+1 disks arranged in a RAID array when one of said disks fails while preserving concurrent access to said array by a user application, each of said disks in said storage system having a plurality of data blocks, a plurality of data block state bits, each data block state bit associated with one of said data blocks, each data block state bit having a first state indicating that said associated data block may contain invalid information and a second state indicating that said associated data block contains valid information, a plurality of parity blocks, each parity block associated with n data blocks, a plurality of groups of parity block state bits, each group of parity block state bits indicating that said associated parity block contains parity information or data or the contents are undefined, and a group of array state bits indicating the condition of the array as "normal," "folding," "fully folded" or "unfolding," said method comprising the steps of:

(a) receiving a write request from said user application to write to a targeted data block;

(b) inserting a replacement disk;

(c) interrogating said array state bits to determine the state of said array;

(d) if said array state bits indicate said array is in said "unfolding" state, then proceeding with an "unfolding" write operation and proceeding with a deliberate process to complete said reorganization concurrently with user application access to said array.

11. The method of on-line reorganization of data in a storage system as set forth in claim 10, wherein said "unfolding" write operation comprises the following steps:

(e) determining if said targeted data block of said write request is on said failed disk;

(f) if said targeted data block is on said failed disk, then,
  (1) interrogating said state bits of said parity block associated with said targeted data block;
  (2) if said state bits of said associated parity block are in said data state or said undefined state, then proceed with a MRW write operation to said data block;
  (3) if said state bits of said associated parity block are in said parity state, then interrogating said data block state bit and, if invalid, performing a MRW write operation to said data block and, if valid, performing a MRMW write operation to said data block;

(g) if said targeted data block is not on said failed disk, then determining if said replacement disk normally contains parity;

(h) if said replacement disk does not normally contain parity, then,
  (1) interrogating said state bits of said parity block associated with said targeted data block;
  (2) if said state bits of said associated parity block are in said data state or said undefined state, then proceeding with a NRW write operation to said data block;
  (3) if said state bits of said parity block are in said parity state, then proceeding with a MRMW write operation to said data block;

(i) if said replacement disk does normally contain parity, then,
  (1) interrogating said state bits of said parity block associated with said target data block;
  (2) if said state bits are in said parity state, then interrogating said state bits of said data block and, if valid, proceeding with a MRMW write operation to said data block and, if invalid, proceeding with a MRW write operation to said data block;
  (3) if said state bits are in said undefined state, then proceeding with a MRW write operation to said data block and, if unsuccessful, then proceeding with a MRMW write operation to said data block.

12. The method of on-line reorganization of data in a storage system as set forth in claim 11, wherein said deliberate process comprises the following steps:
  (j) setting said state bits for every one of said data blocks on said replacement disk to said invalid state;
  (k) setting said state bits for every one of said parity blocks on said replacement disk to said undefined state;
  (l) setting said array state bits to said "unfolding" state;
  (m) interrogating the parity block state bits of one of said parity blocks;
  (n) if said parity block state bits indicate said parity block is in said parity state and said corresponding $n-1$ data block state bits indicate said $n-1$ data blocks are in said valid state, then regenerating said targeted data block, writing said regenerated data block to said replacement disk and setting said data block state bits for said data block to said valid state;
  (o) if said parity block state bits indicate said parity block is in said data state and the corresponding data block state bit indicates said data block is in said invalid state, then copying the contents of said parity block to the corresponding data block on said replacement disk, and setting said data block state bit to said valid state; and
    (1) if said state bits for all corresponding data blocks are in the valid state, then calculating the associated parity, writing said calculated parity to said parity block, setting said parity block state bits to said parity state;
    (2) if said state bits for all corresponding data blocks are not in said valid state, then setting said parity block state bits to said undefined state;
  (p) if said parity block state bits indicate said parity block is in said undefined state and said corresponding data block state bits are in said valid state, then calculating the associate parity, writing said calculated parity to said parity block, setting said parity block state bits to said parity state; and
  (q) determining if all parity blocks have been processed, if not, repeating steps (m) through (p) and, if so, set said array state bits to said "normal" state.

13. A method for the replacement of a recently failed disk in a storage system having $n+1$ disks arranged in a RAID array, each of said disks in said storage system having a plurality of data blocks, a plurality of data block state bits, each data block state bit associated with one of said data blocks, and having a first state indicating that said associated data block may contain invalid information and a second state indicating that said associated data block contains valid information, a plurality of parity blocks, each parity block associated with n data block, a plurality of groups of parity block state bits, each group of parity block state bits indicating that said associated parity block contains parity information or data or the contents are undefined, and a group of array state bits indicating the condition of the array as "normal," "folding," "fully folded" or "unfolding," said method comprising the steps of:
  (a) detecting a failed disk;
  (b) removing said failed disk from the array;
  (c) setting all parity block status bits to said undefined state on said failed disk;
  (d) setting to said invalid state all status bits of data blocks having associated parity block status bits in said data or undefined state on said failed disk;
  (e) inserting said failed disk into said array; and
  (f) setting said array state bits from folding to unfolding state.

* * * * *